United States Patent
Kimura et al.

(10) Patent No.: US 10,661,761 B2
(45) Date of Patent: May 26, 2020

(54) FOREIGN MATTER REMOVAL DEVICE AND VEHICLE EQUIPPED WITH FOREIGN MATTER REMOVAL DEVICE

(71) Applicant: KOITO MANUFACTURING CO., LTD., Tokyo (JP)

(72) Inventors: Hiroaki Kimura, Shizuoka (JP); Junji Baba, Shizuoka (JP); Akinobu Kubota, Shizuoka (JP); Yasuhiro Ichikawa, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 160 days.

(21) Appl. No.: 15/740,884

(22) PCT Filed: Jun. 29, 2016

(86) PCT No.: PCT/JP2016/069334
§ 371 (c)(1),
(2) Date: Dec. 29, 2017

(87) PCT Pub. No.: WO2017/002877
PCT Pub. Date: Jan. 5, 2017

(65) Prior Publication Data
US 2018/0186341 A1    Jul. 5, 2018

(30) Foreign Application Priority Data

Jun. 30, 2015 (JP) ................ 2015-131783
Jun. 30, 2015 (JP) ................ 2015-131784
Jun. 30, 2015 (JP) ................ 2015-131787

(51) Int. Cl.
*B60S 1/54*    (2006.01)
*H04N 7/18*    (2006.01)
(Continued)

(52) U.S. Cl.
CPC ............. *B60S 1/54* (2013.01); *B60R 11/04* (2013.01); *B60S 1/56* (2013.01); *H04N 5/225* (2013.01); *H04N 7/18* (2013.01)

(58) Field of Classification Search
CPC .. B60S 1/54; B60S 1/56; H04N 5/225; H04N 7/18; B60R 11/04
(Continued)

(56) References Cited

U.S. PATENT DOCUMENTS 9,538,054 B2 * 1/2017 Hayakawa ............. G03B 17/08
2011/0073142 A1 3/2011 Hattori et al.
(Continued)

FOREIGN PATENT DOCUMENTS

CN    201923085 U    8/2011
CN    104470769 A    3/2015
(Continued)

OTHER PUBLICATIONS

International Search Report (PCT/ISA/210) dated Sep. 27, 2016 issued by the International Searching Authority in counterpart International Application No. PCT/JP2016/069334.
(Continued)

*Primary Examiner* — David Redding
(74) *Attorney, Agent, or Firm* — Sughrue Mion, PLLC

(57) ABSTRACT

A foreign matter removal device of the present invention is a foreign matter removal device that removes foreign matters adhering to a lens (101) included in an in-vehicle camera (100), including a camera bracket (91) that attaches the in-vehicle camera (100) to a rear bumper panel (200b) of a vehicle in a state in which the lens (101) is exposed toward the outside of the rear bumper panel (200b) of the vehicle, a high-pressure air generation unit disposed inside the rear bumper panel (200b) and configured to generate high-pressure air, and a nozzle unit provided with a nozzle (22)
(Continued)

that injects the high-pressure air toward the lens (101), wherein a through-hole (92) is formed in the camera bracket (91), and the high-pressure air generated by the high-pressure air generation unit passes from the inside to the outside of the rear bumper panel (200*b*) through the through-hole (92), and is injected from the nozzle (22) toward the lens (101).

27 Claims, 19 Drawing Sheets

(51) Int. Cl.
  *H04N 5/225*    (2006.01)
  *B60R 11/04*    (2006.01)
  *B60S 1/56*    (2006.01)

(58) Field of Classification Search
  USPC .................. 396/419; 359/509; 15/301, 316.1
  See application file for complete search history.

(56) References Cited

U.S. PATENT DOCUMENTS

| | | | |
|---|---|---|---|
| 2013/0092758 A1 | 4/2013 | Tanaka et al. | |
| 2015/0078940 A1 | 3/2015 | Kikuta et al. | |
| 2015/0151722 A1 | 6/2015 | Gokan et al. | |
| 2015/0166021 A1 | 6/2015 | Gokan et al. | |
| 2015/0185592 A1 | 7/2015 | Eineren et al. | |
| 2015/0296108 A1 | 10/2015 | Hayakawa et al. | |
| 2015/0353024 A1 | 12/2015 | Cooper | |
| 2015/0353057 A1 | 12/2015 | Witte | |
| 2017/0028968 A1 | 2/2017 | Kubota et al. | |

FOREIGN PATENT DOCUMENTS

| | | |
|---|---|---|
| EP | 2878999 A1 | 6/2015 |
| EP | 2949520 A1 | 12/2015 |
| JP | 2001-171491 A | 6/2001 |
| JP | 2009-083730 A | 4/2009 |
| JP | 2012-132988 A | 7/2012 |
| JP | 2012-201122 A | 10/2012 |
| JP | 2014-69586 A | 4/2014 |
| JP | 2015-083830 A | 4/2015 |
| WO | 2014/017405 A1 | 1/2014 |
| WO | 2015/159763 A1 | 10/2015 |

OTHER PUBLICATIONS

Written Opinion (PCT/ISA/237) dated Sep. 27, 2016 issued by the International Searching Authority in counterpart International Application No. PCT/JP2016/069334.

Communication dated Feb. 22, 2019, issued by the European Patent Office in counterpart European Patent Application No. 16817985.1.

\* cited by examiner

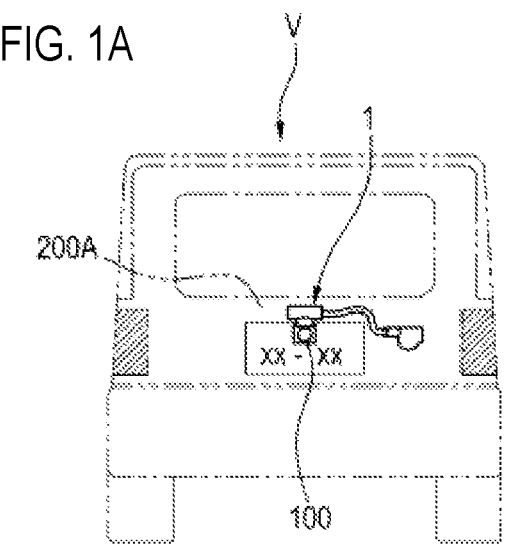
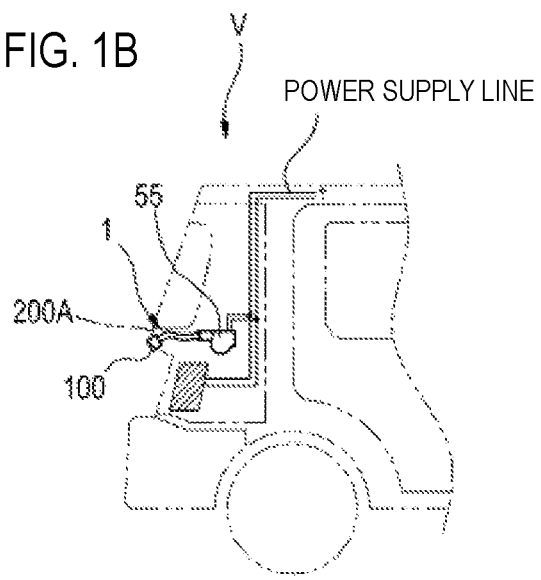
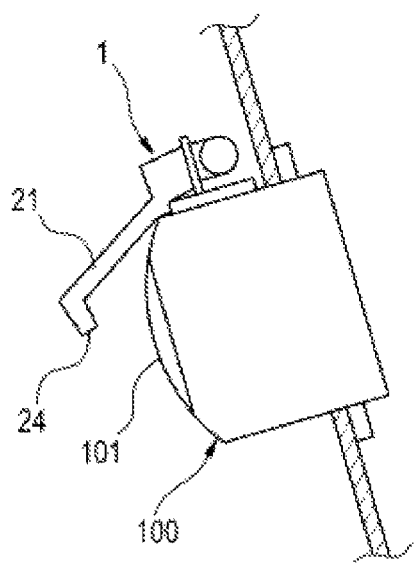

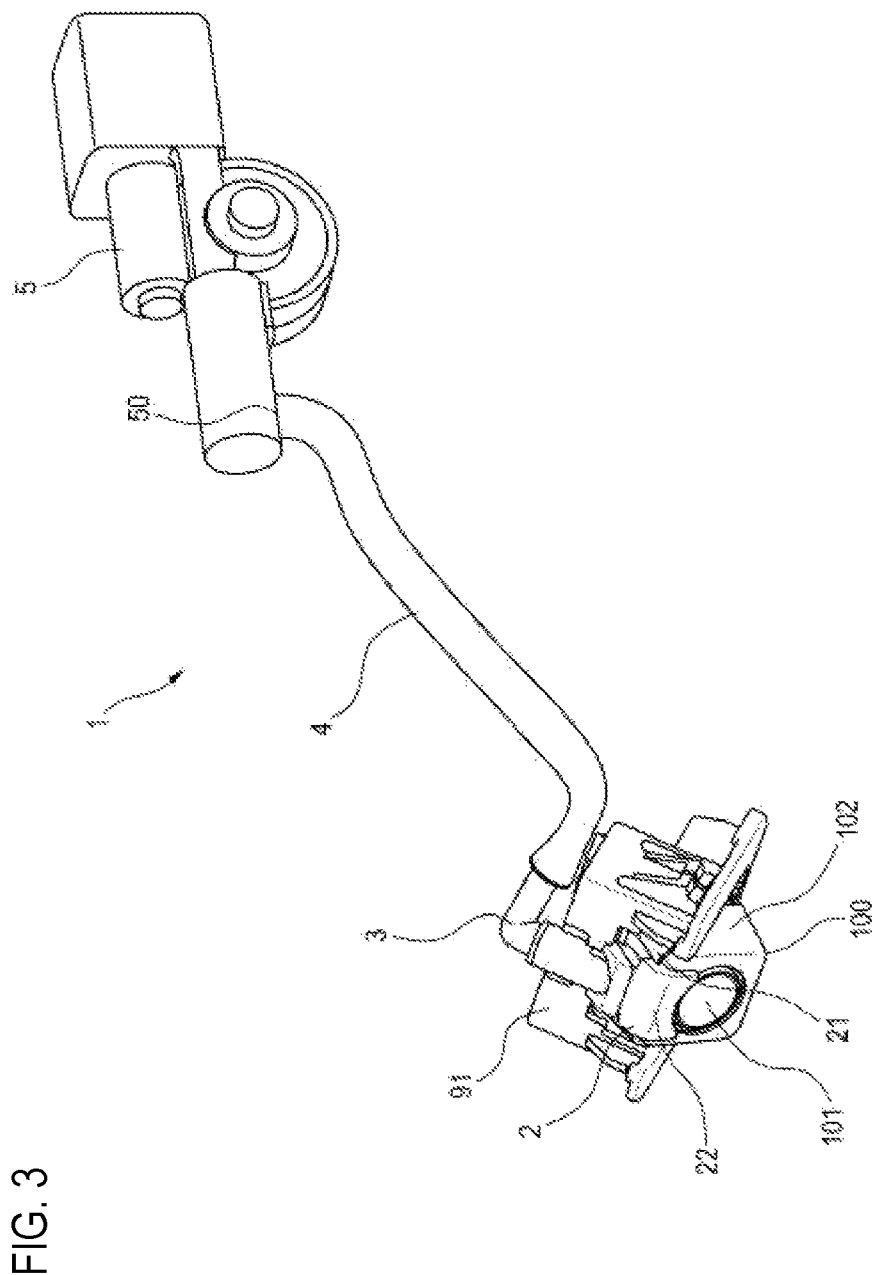

FOREIGN MATTER REMOVAL DEVICE AND VEHICLE EQUIPPED WITH FOREIGN MATTER REMOVAL DEVICE

TECHNICAL FIELD

The present invention relates to a device for removing foreign matters by injecting high-pressure air.

BACKGROUND ART

Recently, the number of vehicles equipped with in-vehicle cameras for photographing the situations around the vehicle is increasing. In the in-vehicle cameras, there is a case that a lens as an imaging surface becomes dirty due to rain, mud or the like. Therefore, conventionally, a foreign matter removal device for removing foreign matters by blowing cleaning liquid or high-pressure air or the like to the lens of the in-vehicle camera in order to remove foreign matters such as water droplets adhering on the lens has been known.

In such a foreign matter removal device, the performance of removing foreign matters may be deteriorated when the positioning accuracy of the tip end of the nozzle with respect to the lens of the camera is low. Therefore, for example, a structure has been proposed in which a dedicated bracket is provided on a body panel of a vehicle, and a nozzle is positioned with respect to a lens via the dedicated bracket (see Patent Document 1). In Patent Document 1, a part of the camera and the nozzle are arranged in a space provided at the rear of the body panel and located between a garnish and the body panel, and an imaging surface of the camera protrudes outward from an opening portion of the garnish.

Further, in the foreign matter removal device disclosed in the following Patent Document 1, a tank in which cleaning liquid is stored and a unit for injecting the cleaning liquid are mounted inside a body panel of a vehicle. Then, a dedicated nozzle bracket is attached to the body panel of the vehicle, and the cleaning liquid is injected onto the lens exposed toward the outside of the vehicle via the nozzle bracket (see Patent Document 1).

CITATION LIST

Patent Document

Patent Document 1: Japanese Patent Laid-Open Publication No. 2014-69586

DISCLOSURE OF INVENTION

Problems to be Solved by Invention

In the configuration disclosed in Patent Document 1, at the time of attaching the foreign matter removal device to the vehicle, in addition to a hole for fitting the in-vehicle camera, a hole for fitting the nozzle bracket should be formed in the body panel of the vehicle. Therefore, the work efficiency when attaching the foreign matter removal device is lowered.

One object of the present invention is to provide a foreign matter removal device capable of enhancing the work efficiency when attaching the foreign matter removal device to an object such as a vehicle, and a vehicle equipped with the foreign matter removal device.

Further, in the configuration disclosed in Patent Document 1, when inserting the in-vehicle camera into the camera bracket having an insertion hole, an assembly worker has to perform the work so that the housing or the like of the in-vehicle camera does not come into contact with the tip end of the nozzle, and thus, the work efficiency is lowered. When the housing or the like of the in-vehicle camera comes into contact with the tip end of the nozzle, the positioning of the nozzle with respect to the lens of the in-vehicle camera is deviated, thereby deteriorating the performance of removing foreign matters.

Further, the shape of the body panel of the vehicle varies depending on the type of the vehicle. Therefore, it is considered that the direction in which the in-vehicle camera is attached to the vehicle body and the direction in which the pipeline (nozzle bracket or joint member, etc.) for passing high-pressure air is attached do not match in many cases. Since the nozzle for injecting high-pressure air is attached to a position close to the in-vehicle camera, the spaces required for each attaching work sometimes interfere with each other when the attachment directions of the in-vehicle camera and the pipeline are different. Also in this case, the work efficiency when attaching the foreign matter removal device to the vehicle is lowered.

Another object of the present invention is to provide a foreign matter removal device capable of enhancing the work efficiency when attaching the foreign matter removal device to an object such as a vehicle while maintaining the performance of removing foreign matters, and a vehicle equipped with the foreign matter removal device.

Further, generally, there is a restriction on the space between the garnish and the body panel and the size of the opening portion of the garnish. Therefore, in the method of assembling the nozzle on a dedicated bracket as in Patent Document 1, the camera and the nozzle cannot be assembled to the body panel in a state in which the garnish is attached to the body panel. Accordingly, after detaching the garnish from the body panel and assembling the camera and the nozzle to the body panel, the garnish should be attached to the body panel again. As a result, the versatility and the work efficiency when attaching the foreign matter removal device to the vehicle are deteriorated.

Yet another object of the present invention is to provide a foreign matter removal device capable of enhancing the versatility and the work efficiency when attaching the foreign matter removal device to an object such as a vehicle while maintaining the performance of removing foreign matters, and a vehicle equipped with the foreign matter removal device.

Means for Solving the Problems

In order to achieve the above object, a foreign matter removal device of the present invention removes foreign matters adhering to a lens included in an in-vehicle camera, the foreign matter removal device comprising:

a camera bracket that attaches the in-vehicle camera to a body panel of a vehicle in a state in which the lens is exposed toward the outside of the body panel of the vehicle, a high-pressure air generation unit disposed inside the body panel and configured to generate high-pressure air; and a nozzle unit provided with a nozzle that injects the high-pressure air toward the lens, wherein a through-hole is formed in the camera bracket, and the high-pressure air generated by the high-pressure air generation unit passes from the inside to the outside of the body panel through the through-hole, and is injected from the nozzle toward the lens.

According to this configuration, the high-pressure air generated by the high-pressure air generation unit can pass from the inside to the outside of the body panel of the vehicle through the through-hole formed in the camera bracket. Therefore, it is not necessary to form a hole for passing the high-pressure air in the body panel of the vehicle. In this way, the work efficiency when attaching the foreign matter removal device to the vehicle is enhanced.

Further, in the foreign matter removal device of the present invention, the through-hole may be a pipeline through which the high-pressure air passes.

According to this configuration, the high-pressure air can pass from the inside to the outside of the body panel of the vehicle via the through-hole formed in the camera bracket Further, in the foreign matter removal device of the present invention, the high-pressure air generation unit may have a discharge port that discharges the high-pressure air, the pipeline may have a pipeline inlet into which the high-pressure air flows and a pipeline outlet from which the high-pressure air flows out, and the foreign matter removal device may further comprise a hose that connects the discharge port and the pipeline inlet; and a joint member that connects the hose and the pipeline inlet.

According to this configuration, the high-pressure air passes from the high-pressure air generation unit in the order of the hose, the joint member and the pipeline, and can pass from the inside to the outside of the body panel of the vehicle while maintaining its flow velocity.

Further, in the foreign matter removal device of the present invention, the nozzle may have an inlet port into which the high-pressure air flows, the inlet port may be larger than the pipeline outlet, and a gap may be formed between an outer peripheral surface of the pipeline and an inner peripheral surface of the inlet port in a state in which the nozzle communicates with the pipeline.

According to this configuration, an assembly work at the time of communicating the nozzle with the pipeline is facilitated.

Further, in the foreign matter removal device of the present invention, the joint member may be formed integrally with the camera bracket.

According to this configuration, since the work of attaching the joint member to the pipeline is omitted, the work efficiency when attaching the foreign matter removal device to the vehicle is further improved.

Further, in the foreign matter removal device of the present invention, the nozzle unit may be formed integrally with the camera bracket.

According to this configuration, it is not necessary to prepare a dedicated bracket for attaching the nozzle unit to the body panel of the vehicle. Therefore, the versatility during attachment is improved, and the work efficiency when attaching the foreign matter removal device to the vehicle is further improved.

Further, in the foreign matter removal device of the present invention, the nozzle unit may be attached to a housing of the in-vehicle camera via an adhesive member.

According to this configuration, it is not necessary to prepare a dedicated bracket for attaching the nozzle unit to the body panel of the vehicle. Therefore, the versatility during attachment is improved, and the work efficiency when attaching the foreign matter removal device to the vehicle is further improved.

Further, in the foreign matter removal device of the present invention, the high-pressure air generation unit may have a discharge port from which the high-pressure air flows out, the nozzle may have an inlet port into which the high-pressure air flows, the foreign matter removal device may further comprise a hose that connects the discharge port and the inlet port, and the hose may pass through the through-hole.

According to this configuration, since the hose passes from the inside to the outside of the body panel through the through-hole of the camera bracket, it is possible to simply realize a configuration in which the high-pressure air passes to the outside of the body panel.

Further, a foreign matter removal device of the present invention removes foreign matters adhering to a lens of a camera, the foreign matter removal device comprising:

a camera bracket that attaches the camera to a panel member in a state in which the lens is exposed toward the outside of the panel member, a high-pressure air generation unit disposed inside the panel member and configured to generate high-pressure air; and a nozzle unit provided with a nozzle that injects the high-pressure air toward the lens, wherein a through-hole is formed in the camera bracket, and the high-pressure air generated by the high-pressure air generation unit passes from the inside to the outside of the panel member through the through-hole, and is injected from the nozzle toward the lens.

According to this configuration, the high-pressure air generated by the high-pressure air generation unit can pass from the inside to the outside of the panel member through the through-hole formed in the camera bracket. Therefore, it is not necessary to form a hole for passing the high-pressure air in the panel member. In this way, the work efficiency when attaching the foreign matter removal device to the vehicle is enhanced.

Further, a foreign matter removal device of the present invention removes foreign matters adhering to a partition wall interposed between an in-vehicle sensor and a measuring target of the in-vehicle sensor, the foreign matter removal device comprising:

a bracket that attaches the in-vehicle sensor to a panel member in a state in which the partition wall is exposed toward the outside of the panel member, a high-pressure air generation unit disposed inside the panel member and configured to generate high-pressure air; and a nozzle unit provided with a nozzle that injects the high-pressure air toward the partition wall, wherein a through-hole is formed in the bracket, and the high-pressure air generated by the high-pressure air generation unit passes from the inside to the outside of the panel member through the through-hole, and is injected from the nozzle toward the partition wall.

Further, a vehicle of the present invention comprises the foreign matter removal device described above.

According to this configuration, for example, even when a lens of an in-vehicle camera becomes dirty due to rain, mud or the like, foreign matters on the lens can be removed by blowing high-pressure air thereto.

Further, in order to achieve the above object, a foreign matter removal device of the present invention removes foreign matters adhering on a lens of an in-vehicle camera attached to a vehicle so that the lens of the in-vehicle camera is exposed toward the outside of a body panel of a vehicle, the foreign matter removal device comprising:
a high-pressure air generation unit disposed inside the body panel and configured to generate high-pressure air,
a nozzle unit including a nozzle that injects the high-pressure air toward the lens and attached to a housing of the in-vehicle camera; and
a pipeline that passes the high-pressure air generated by the high-pressure air generation unit from the inside to the outside of the body panel,
wherein the pipeline has a pipeline inlet into which the high-pressure air flows and a pipeline outlet from which the high-pressure air flows out,
the nozzle has an inlet port into which the high-pressure air flows,
the inlet port is larger than the pipeline outlet, and
the pipeline outlet is inserted into the inlet port.

According to this configuration, since the nozzle unit is attached to the housing of the in-vehicle camera, the nozzle of the nozzle unit and the pipeline are communicated with each other when the in-vehicle camera is attached to the body panel of the vehicle. At this time, since the inlet port of the nozzle is larger than the pipeline outlet, the nozzle and the pipeline are difficult to come into contact with each other. Further, the positioning between the nozzle and the lens is completed when the nozzle unit is attached to the housing of the in-vehicle camera. Therefore, an assembly worker can perform an operation of attaching the in-vehicle camera to the body panel without worrying about the positioning accuracy between the nozzle and the lens. In this way, according to the above configuration, it is possible to improve the work efficiency when attaching the foreign matter removal device to the vehicle while maintaining the performance of removing foreign matters.

Further, in the foreign matter removal device of the present invention,
in a state in which the nozzle unit is attached to the housing, an attachment direction when the in-vehicle camera is attached to the body panel, and a communication direction when the nozzle and the pipeline are communicated with each other may intersect with each other.

In the case where the attachment direction when the in-vehicle camera is attached to the body panel, and the communication direction when the nozzle and the pipeline are communicated with each other intersect with each other, the nozzle and the pipeline are more likely to come into contact with each other, as compared with a case where the attachment direction and the communication direction coincide. However, according to the above configuration, since the inlet port of the nozzle is larger than the pipeline outlet, the nozzle and the pipeline are difficult to come into contact with each other, so that the efficiency of the assembly work can be improved.

Further, in the foreign matter removal device of the present invention,
in a state in which the in-vehicle camera is attached to the body panel, the nozzle may communicate with the pipeline in a state in which a gap is formed between an outer peripheral surface of the pipeline and an inner peripheral surface of the nozzle.

According to this configuration, even when the clogging of the ejecting port of nozzle temporarily occurs, the air intake for generating high-pressure air can be performed by using the gap because the gap between the outer peripheral surface of the pipeline and the inner peripheral surface of the nozzle can function as a bypass path.

Further, in the foreign matter removal device of the present invention,
a rib that prevents water from intruding into the gap from the outside may be provided on the pipeline.

According to this configuration, since water hardly intrudes into the gap, it is easy to maintain the performance of removing foreign matters even in rainy weather or the like.

Further, the foreign matter removal device of the present invention may comprise a camera bracket that attaches the in-vehicle camera to the body panel,
wherein the pipeline may be formed in the camera bracket.

According to this configuration, the efficiency of the operation of attaching the in-vehicle camera to the body panel is improved.

Further, a foreign matter removal device of the present invention removes foreign matters adhering on a lens of a camera attached to a vehicle so that the lens of the camera is exposed toward the outside of a panel member, the foreign matter removal device comprising:
a high-pressure air generation unit disposed inside the panel member and configured to generate high-pressure air,
a nozzle unit including a nozzle that injects the high-pressure air toward the lens and attached to a housing of the camera; and
a pipeline that passes the high-pressure air generated by the high-pressure air generation unit from the inside to the outside of the panel member,
wherein the pipeline has a pipeline inlet into which the high-pressure air flows and a pipeline outlet from which the high-pressure air flows out,
the nozzle has an inlet port into which the high-pressure air flows,
the inlet port is larger than the pipeline outlet, and
the pipeline outlet is inserted into the inlet port.

According to this configuration, since the nozzle unit is attached to the housing of the camera, the nozzle of the nozzle unit and the pipeline are communicated with each other when the camera is attached to the panel member. At this time, since the inlet port of the nozzle is larger than the pipeline outlet, the nozzle and the pipeline are difficult to come into contact with each other. Further, the positioning between the nozzle and the lens is completed when the nozzle unit is attached to the housing of the camera. Therefore, an assembly worker can perform an operation of attaching the camera to the panel member without worrying about the positioning accuracy between the nozzle and the lens. In this way, according to the above configuration, it is possible to improve the work efficiency when attaching the foreign matter removal device to the vehicle while maintaining the performance of removing foreign matters.

Further, a foreign matter removal device of the present invention removes foreign matters adhering to a partition wall interposed between an in-vehicle sensor and a measuring target of the in-vehicle sensor, the foreign matter removal device comprising:
a high-pressure air generation unit disposed inside a panel member and configured to generate high-pressure air,
a nozzle unit including a nozzle that injects the high-pressure air toward the partition wall and attached to a housing of the in-vehicle sensor; and a pipeline that passes the high-pressure air generated by the high-pressure air generation unit from the inside to the outside of the panel member, wherein the pipeline has a pipeline inlet into which the high-pressure air flows and a pipeline outlet from which the high-pressure air flows out, the nozzle has an inlet port into which the high-pressure air flows, the inlet port is larger than the pipeline outlet, and the pipeline outlet is inserted into the inlet port.

Further, a vehicle of the present invention comprises the foreign matter removal device described above.

According to this configuration, for example, even when a lens of an in-vehicle camera becomes dirty due to rain, mud or the like, foreign matters on the lens can be removed by blowing high-pressure air thereto.

Further, a foreign matter removal device of the present invention removes foreign matters adhering on a lens of an in-vehicle camera attached to a vehicle so that the lens of the in-vehicle camera is exposed toward the outside of a vehicle body panel, the foreign matter removal device comprising:

a generation unit that generates high-pressure air; and a nozzle that injects the high-pressure air toward the lens, wherein the nozzle is attached to an inner surface of the vehicle body panel, and a tip end portion thereof protrudes to the outside of the vehicle through a gap formed between the vehicle body panel and the in-vehicle camera and is disposed to face the front surface of the lens.

The "vehicle body panel" includes a body panel of a vehicle, or a garnish provided outside the body panel.

According to the above configuration, the nozzle is attached to the inner surface of the vehicle body panel of the vehicle, and the tip end portion of the nozzle is provided to protrude to the outside of the vehicle through the gap formed between the vehicle body panel and the in-vehicle camera. Therefore, when attaching the camera and the nozzle to the vehicle, the nozzle can be attached to the inner surface of the vehicle body panel, and then, the camera can be attached to the vehicle body panel by being inserted from the opening portion of the vehicle body panel. Therefore, the tip end portion of the nozzle can be placed without interfering with the in-vehicle camera attached to the vehicle body panel. In this way, there is no need for post-processing to the vehicle body panel in order to attach the foreign matter removal device, and the versatility and work efficiency when attaching the foreign matter removal device to the vehicle are improved.

Preferably, the tip end portion of the nozzle has an opening shape which is bent to the opposite side of the side facing the lens and then is bent again toward the side of the lens.

According to the above configuration, even when the gap between the garnish and the camera attaching member is narrow, the optimum position of the tip end portion of the nozzle with respect to the lens of the in-vehicle camera can be secured by forming the tip end portion of the nozzle bent in a substantially S shape, so that the performance of removing foreign matters can be maintained.

Preferably, an angle formed by a line passing through the center of an ejecting port of the nozzle and a tangential line of the apex of the lens is 0° or more but 60° or less.

Preferably, when the lens is divided into six equal parts in an upper and lower direction, the line passing through the center of the ejecting port of the nozzle intersects with the second region from the top of the lens.

According to this configuration, the high-pressure air can be easily blown onto the entire surface of the lens, thereby enhancing the performance of removing foreign matters.

Preferably, the tip end portion of the nozzle includes an inner member facing the lens and an outer member disposed on the side opposite to the lens across the inner member, and the inner member and the outer member are coupled to form the tip end portion having a hollow shape.

According to the above configuration, by dividing the tip end portion of the nozzle into the inner member and the outer member and coupling and assembling these members, the degree of freedom in designing the shape of the tip end portion can be improved and the cost associated with the mold fabrication can be reduced.

Preferably, the tip end portion further includes a connecting portion that connects the inner member and the outer member, and the inner member and the outer member are coupled by bending the connecting portion.

According to the above configuration, since the inner member and the outer member are connected to each other via the connecting portion, it is easy to couple the inner member and the outer member to each other.

Further, a foreign matter removal device according to another example of the present invention removes foreign matters on a lens of a camera attached to a panel member so that the lens of the camera is exposed toward the outside of the panel member, the foreign matter removal device comprising:

a generation unit that generates high-pressure air; and a nozzle that injects the high-pressure air toward the lens, wherein the nozzle is attached to an inner surface of the panel member, and a tip end portion thereof protrudes to the outside of the panel member through a gap formed between the panel member and the camera and is disposed to face the front surface of the lens.

According to the above configuration, when attaching the camera and the nozzle to the panel member, the nozzle can be attached to the inner surface of the panel member, and then, the camera can be attached to the panel member by being inserted from the opening portion of the panel member. Therefore, the tip end portion of the nozzle can be placed without interfering with the camera attached to the panel member. In this way, there is no need for post-processing to the panel member in order to attach the foreign matter removal device, and the versatility and work efficiency when attaching the foreign matter removal device to the vehicle are improved.

Further, a foreign matter removal device according to the present invention removes foreign matters adhering to a partition wall interposed between an in-vehicle sensor and a measuring target of the in-vehicle sensor, the foreign matter removal device comprising:

a generation unit that generates high-pressure air; and a nozzle that injects the high-pressure air toward the partition wall, wherein the nozzle is attached to an inner surface of a panel member, and a tip end portion thereof protrudes to the outside of the panel member through a gap formed between the panel member and the in-vehicle sensor and is disposed to face the front surface of the partition wall.

Further, a vehicle of the present invention comprises the foreign matter removal device described above.

According to this configuration, for example, even when a lens of an in-vehicle camera becomes dirty due to rain, mud or the like, foreign matters on the lens can be removed by blowing high-pressure air thereto, thereby enhancing the accuracy of information obtained from the in-vehicle camera.

Effects of Invention

According to the foreign matter removal device and the vehicle equipped with the foreign matter removal device of the present invention, it is possible to enhance the work efficiency when attaching the foreign matter removal device to a vehicle.

Further, according to the foreign matter removal device of the present invention, it is possible to enhance the versatility and the work efficiency when attaching the foreign matter removal device to a vehicle while maintain the performance of removing foreign matters.

BRIEF DESCRIPTION OF DRAWINGS

FIG. 1A is a rear view (a foreign matter removal device is shown in a perspective view) of a vehicle, FIG. 1B is a side view (the foreign matter removal device is shown in a perspective view) of a rear part of the vehicle, and FIG. 1C is a partial enlarged view of the rear part of the vehicle.

FIG. 3 is a perspective view of a foreign matter removal device according to a first embodiment of the present invention.

EMBODIMENT FOR CARRYING OUT INVENTION

Hereinafter, an example of an embodiment according to the present invention will be described in detail with reference to the drawings.

For example, a foreign matter removal device of the present invention is applied as a device for removing foreign matters such as water droplets, mud and dust adhering to a lens of an in-vehicle camera.

First Embodiment

As shown in FIGS. 1A and 1B, a foreign matter removal device 1 is attached to a back door 200A of a vehicle V, for example. The foreign matter removal device 1 is provided with a motor 55, and a power supply terminal of the motor 55 is connected to a power supply line of a vehicle. For example, with the triggering that a gear of the vehicle V enters a reverse mode, a vehicle control unit (ECU; not shown) causes an in-vehicle camera 100 (to be described later) to start photographing, and the foreign matter removal device 1 is controlled to operate by the vehicle control unit (ECU) within several seconds at the start of photographing, for example.

The in-vehicle camera 100 is a camera for confirming, for example, the rear side of the vehicle V and, as shown in FIG. 1C, a lens 101 of the in-vehicle camera 100 is attached to the back door 200A so that it is exposed toward the outside of the back door 200A of the vehicle V. The in-vehicle camera 100 is provided with an imaging unit (not shown), and the lens 101 covers the imaging unit. As the lens, a simple translucent cover that does not converge or diffuse light is also included in the lens of this example.

Figure 2A:
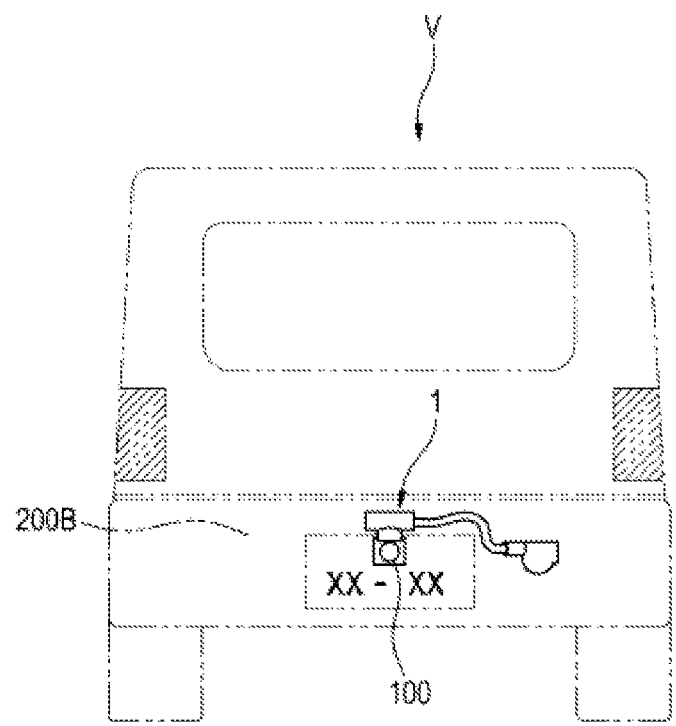
FIGS. 2A and 2B are views showing another example of a position where the foreign matter removal device is attached.
Figure 2B:
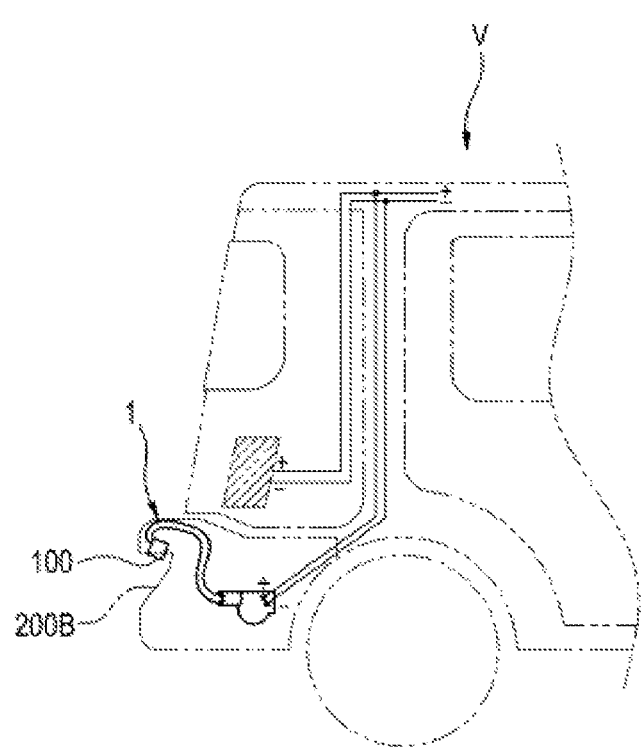

Meanwhile, as shown in FIGS. 2A and 2B, the foreign matter removal device 1 may be attached to a rear bumper 200B of the vehicle V, for example. Meanwhile, the position at which the in-vehicle camera 100 is attached is not limited to the rear end side of the vehicle but may be a body panel such as the front side or lateral side of the vehicle. Further, in this example, the meaning of the phrase, "to be attached to the body panel," includes, for example, a case where the in-vehicle camera is attached via a vehicle mounted component such as a lamp, a door knob, a mirror, a bumper attached to the body panel and a case where the in-vehicle camera is mounted as a part (as an integral body) of these components.

Further, the "body panel" of the vehicle may be a panel member constituting the vehicle and may include at least a back door, a front panel constituting the front side of the vehicle, a side panel constituting the side of the vehicle, a front bumper, a side bumper, a rear bumper, and a cover member (garnish, etc.) for design. Further, the "outer side of the body panel" means a direction in which, among the surfaces constituting the above-described panel member, an outer surface exposed toward the outside of the vehicle faces, and the "inner side of the body panel" means a direction in which an inner surface on the side opposite to the above-described outer surface faces.

As shown in FIG. 3, the foreign matter removal device 1 includes a nozzle unit 2, a camera bracket 91, a joint member 3, a hose 4, a high-pressure air generation unit 5, and an in-vehicle camera 100.

The nozzle unit 2 is configured to be removably attached to the in-vehicle camera 100. The nozzle unit 2 includes an attachment part 21 and a nozzle 22. The nozzle unit 2 is formed of resin material, for example.

The attachment part 21 is attached to a housing 102 of the in-vehicle camera 100 so as to cover a top surface of the in-vehicle camera 100. The nozzle 22 injects high-pressure air toward a lens 101 of the in-vehicle camera 100. The nozzle 22 is formed integrally with the attachment part 21. The nozzle 22 is provided in such a way that a tip end of the nozzle 22 faces the lens 101 when the attachment part 21 is attached to the housing 102. Here, the phrase, "formed integrally with," means that an operator can handle the nozzle 22 and the attachment part 21 as an integral part during assembly work. Specifically, for example, the nozzle 22 and the attachment part 21 may be molded of the same material and in the same mold. Alternatively, the nozzle 22 and the attachment part 21 may be respectively molded of separate materials, and then, fitted together and formed integrally, thereby constituting the nozzle unit 2. Further, the case of describing the expression "integrally formed" with respect to other members is also defined in the same way.

The in-vehicle camera 100 is attached to the body panel of the vehicle V by the camera bracket 91. Further, the camera bracket 91 communicates the nozzle 22 and the joint member 3.

The joint member 3 is a member for joining the camera bracket 91 and the hose 4. One end portion of the joint member 3 is connected to the camera bracket 91 and the opposite end portion thereof is connected to the hose 4. The joint member 3 is formed of resin material, for example.

The hose 4 is a piping member that connects, together with the joint member 3, the nozzle 22 and a high-pressure air generation unit 5. One end portion of the hose 4 is connected to the joint member 3 and the opposite end portion thereof is connected to a discharge port 50 of the high-pressure air generation unit 5. The hose 4 is formed of, for example, a material such as resin or rubber.

The high-pressure air generation unit 5 is a unit for generating high-pressure air to be fed to the nozzle 22. The high-pressure air generation unit 5 is attached to a part of a vehicle body at the inside of a vehicle.

Figure 4:
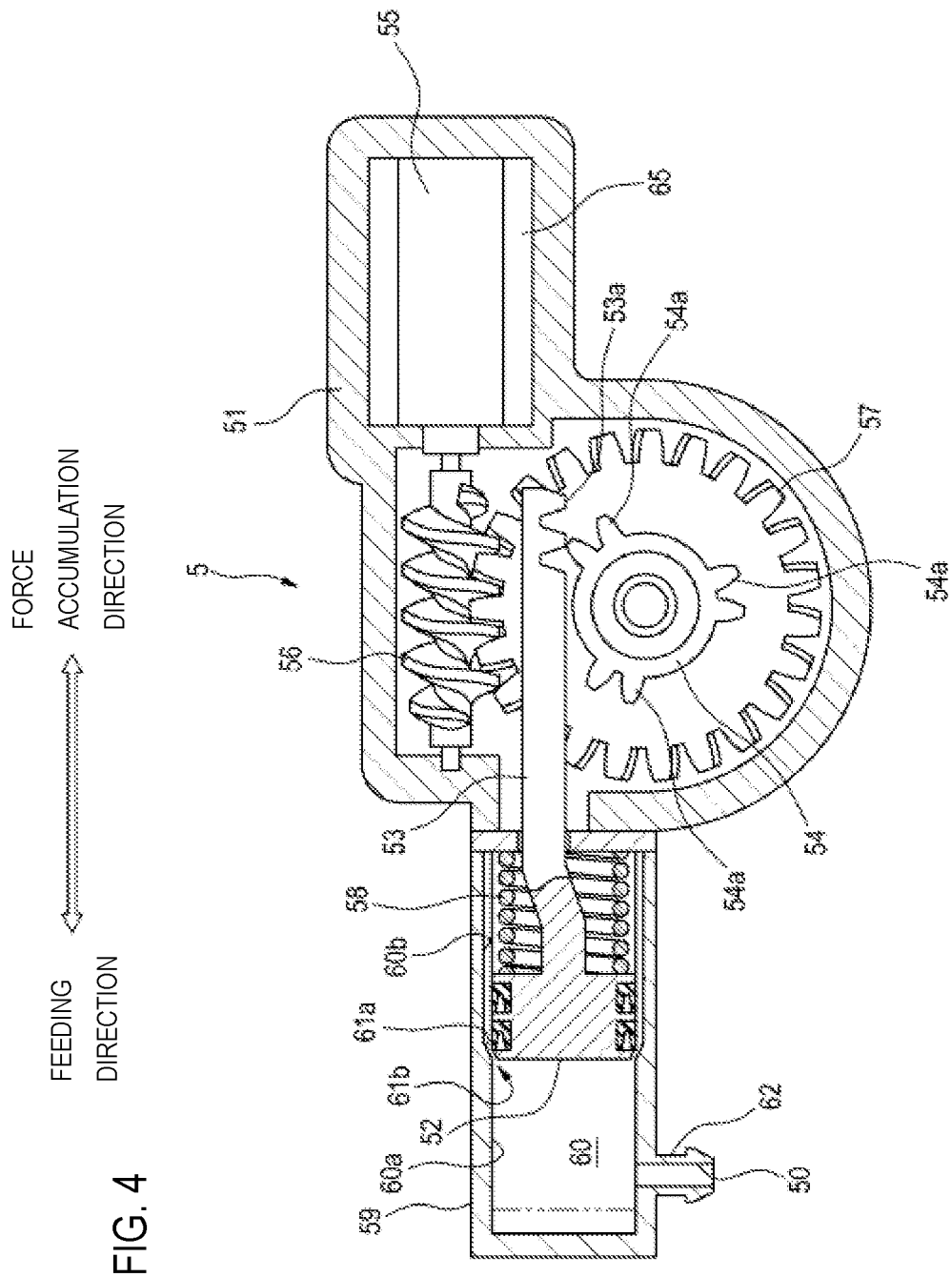
FIG. 4 is a configuration view of a high-pressure air generation unit included in the foreign matter removal device.

As shown in FIG. 4, the high-pressure air generation unit 5 includes a housing (case main body) 51 and a moving mechanism (generation unit) 65 disposed inside the housing 51. The moving mechanism 65 generates high-pressure air. Of a moving direction of a piston 52 in the high-pressure air generation unit 5, a rearward direction that is a direction of feeding out air refers to a feeding direction, and a forward direction that is opposite to the feeding direction refers to a force accumulation direction.

In an initial state before high-pressure air is fed out, the piston 52 is positioned on the feeding direction side, and a rack 53 is positioned in a state where a rack portion 53*a* is engageable with a gear portion 54*a* of a pinion 54.

When the driving of the motor (driving source) 55 is started and a driving force of the motor 55 is transmitted to a worm wheel 57 via a worm 56, the gear portion 54*a* of the pinion 54 is meshed with the rack portion 53*a* of the rack 53. Therefore, the rack 53 moves in the force accumulation direction against an urging force of an urging spring (elastic member) 58 in accordance with the rotation of the pinion 54. As the rack 53 moves in the force accumulation direction, the meshing between the gear portion 54*a* and the rack portion 53*a* is released at a predetermined position. The position (position shown in FIG. 4) where the meshing between the gear portion 54*a* and the rack portion 53*a* is released is set as the bottom dead center of the piston 52. In a state in which the piston 52 is positioned at the bottom dead center, the air (outside air) flowing into a substantially front half portion (second space) 60*b* of an internal space 60 of a piston support portion 59 passes through a gap 61*b* along a step 61*a* and flows toward a substantially rear half portion (first space) 60*a* of the internal space 60.

When the piston 52 is moved to the bottom dead center, the meshing between the gear portion 54*a* and the rack portion 53*a* is released, and the piston 52 is moved in the feeding direction at a speed higher than the moving speed in the force accumulation direction by an urging force of the urging spring 58. In this way, the air flowing from the second space 60*b* to the first space 60*a* passes through the discharge port 50 of a connection protrusion 62 from the first space 60*a* and is fed toward the nozzle 22 of the nozzle unit 2 via the hose 4. At this time, since the diameter of the discharge port 50 is smaller than that of the piston support portion 59, the air discharged from the first space 60*a* through the discharge port 50 is compressed into high-pressure air and is fed out. The moving mechanism 65 repeatedly moves the piston 52 at a high speed to continuously generate high-pressure air.

Figure 5:
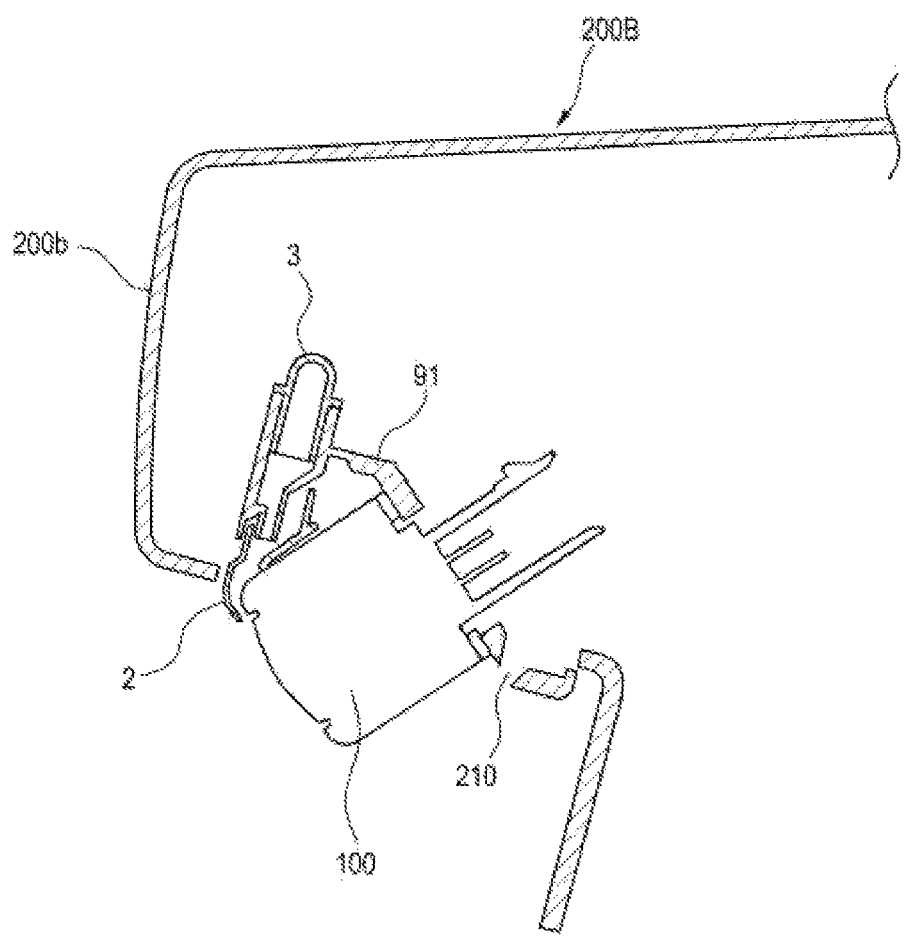
FIG. 5 is a view for explaining the attachment position of an in-vehicle camera included in the foreign matter removal device.

As shown in FIG. 5, the in-vehicle camera 100 is fixed to a rear bumper panel (an example of the panel member) 200*b* constituting an outer surface of the rear bumper 200B of the vehicle V, for example. A hole 210 for attaching the in-vehicle camera 100 is formed in the rear bumper panel 200*b*. The in-vehicle camera 100 is fixed to the rear bumper panel 200*b* via the camera bracket 91 in a state of being fitted into the hole 210. In this example, a part including the lens of the in-vehicle camera 100 is disposed to be exposed to the outside of the rear bumper 200B and a high-pressure air generation unit (not shown) is disposed inside the rear bumper 200B.

Figure 6A:
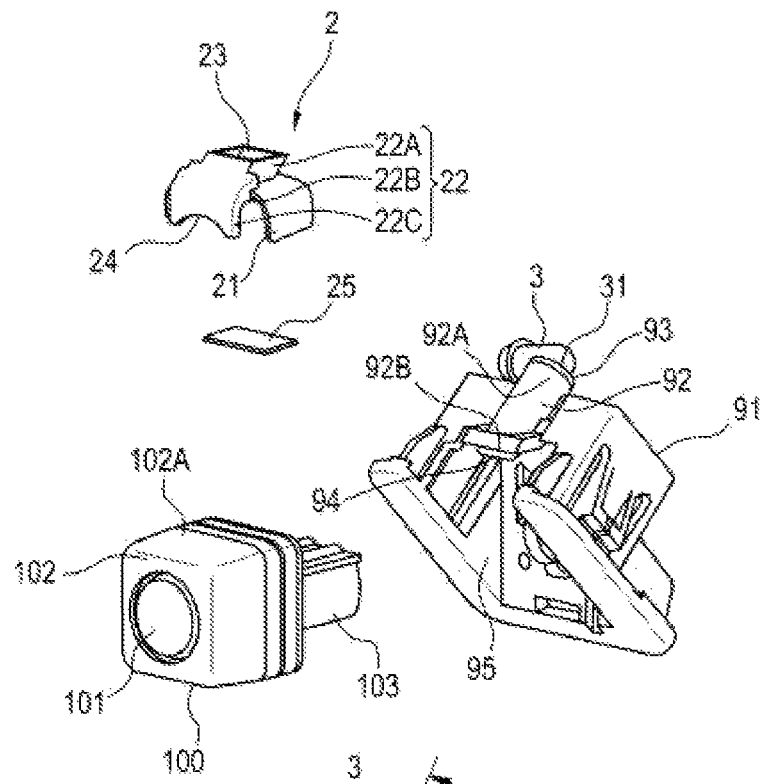
FIGS. 6A and 6B are views for explaining a camera bracket assembled to the in-vehicle camera.
Figure 6B:
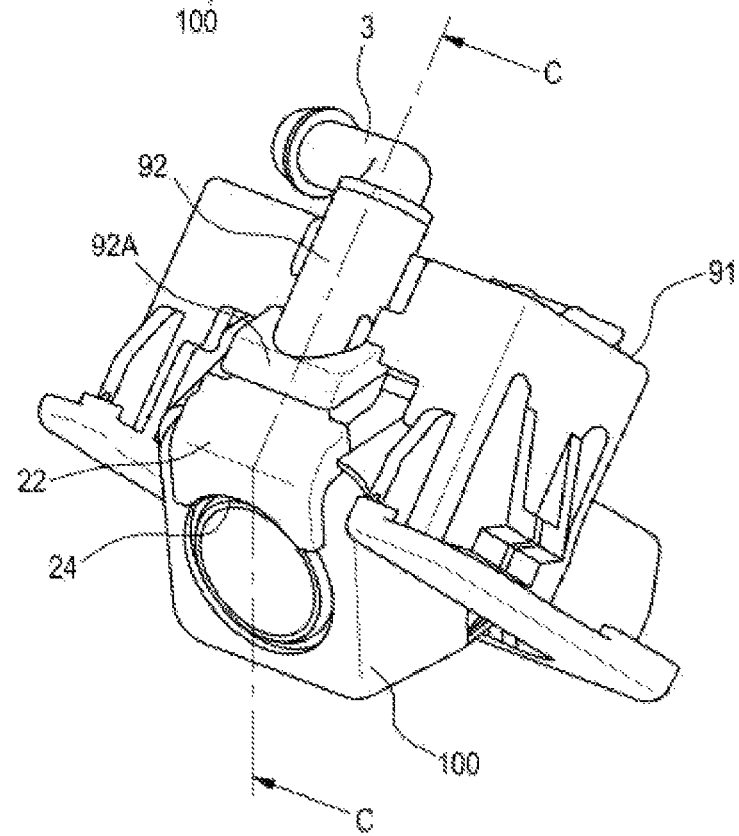
Figure 7:
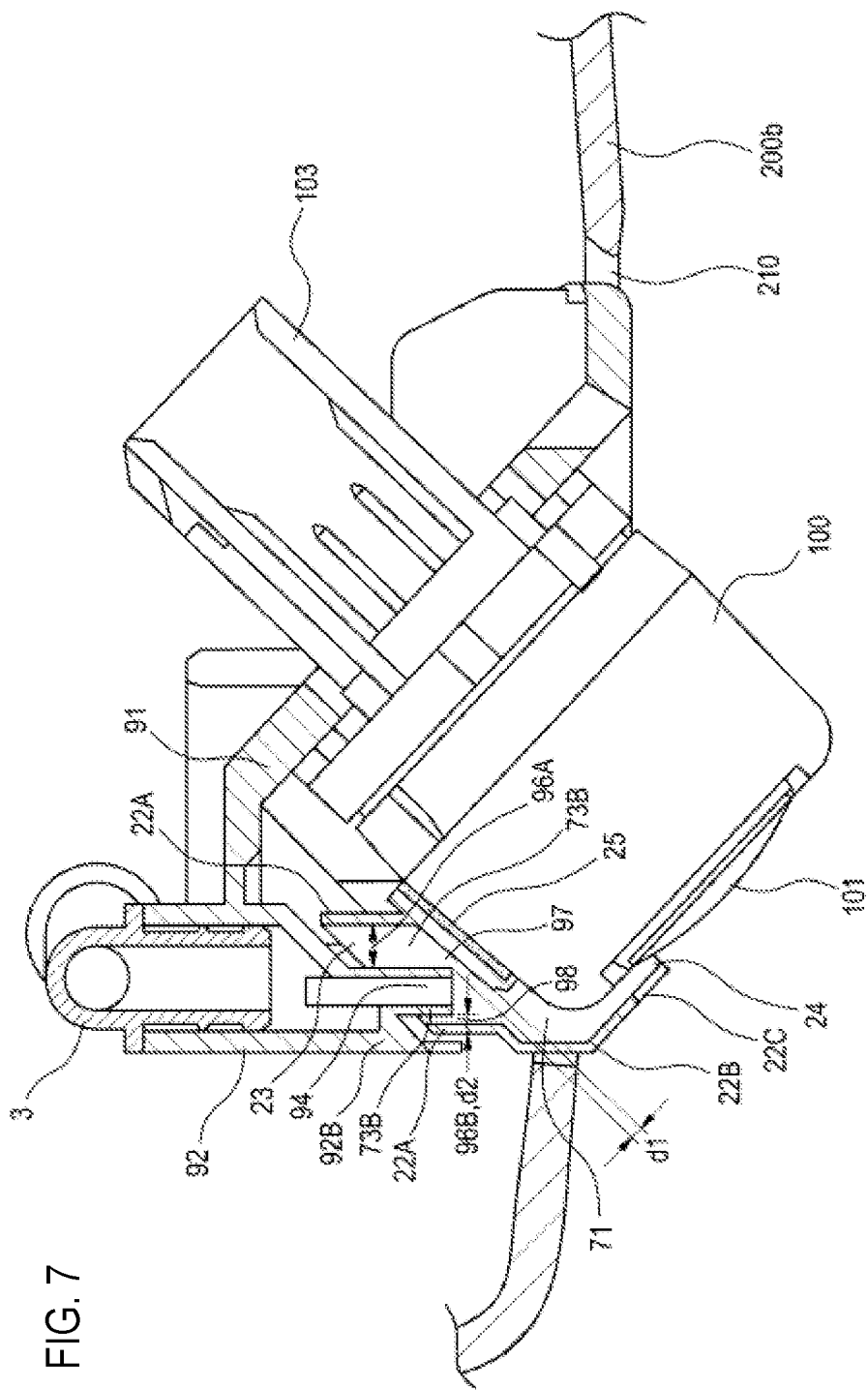
FIG. 7 is a longitudinal sectional view taken along the line C-C in FIG. 6B.

FIG. 6A shows the in-vehicle camera 100 and the nozzle unit 2 to be assembled to the camera bracket 91. FIG. 6B shows a state in which the in-vehicle camera 100 and the nozzle unit 2 are assembled to the camera bracket 91. Further, FIG. 7 shows a sectional view taken along the arrow C-C in FIG. 6B. In FIG. 7, a part of the rear bumper panel 200*b* is shown in order to understand the positional relationship of the in-vehicle camera 100 with respect to the rear bumper panel 200*b*.

As shown in FIG. 7, the camera bracket 91 attaches the in-vehicle camera 100 to the rear bumper panel 200*b* in a state in which the lens 101 of the in-vehicle camera 100 is exposed toward the outside of the rear bumper panel 200*b*.

As shown in FIGS. 6A and 6B, the camera bracket 91 is provided with a pipeline (an example of the through-hole) 92, and an opening portion 95. The pipeline 92 is a pipe that connects the joint member 3 and the nozzle 22. The pipeline 92 has a joint-side connecting portion 92A at an end portion on the side to which the joint member 3 is connected and has a nozzle-side connecting portion 92B at an end portion on the side to which the nozzle 22 is connected. A communication passage through which high-pressure air passes is formed in the pipeline 92. A pipeline inlet 93 into which high-pressure air flows is provided at the joint-side connecting portion 92A, and a pipeline outlet 94 through which high-pressure air is discharged is provided in the nozzle-side connecting portion 92B.

The opening portion 95 is a portion in which the in-vehicle camera 100 is housed. The in-vehicle camera 100 has a connector part 103 provided with a power supply terminal, a signal terminal and the like. The connector part 103 is provided, for example, on the back portion of the in-vehicle camera 100 on the side opposite to the front side where the lens 101 of the in-vehicle camera 100 is provided.

The in-vehicle camera 100 includes the housing 102 having a substantially rectangular parallelepiped shape. The lens 101 of the in-vehicle camera 100 is provided in the housing 102 in a state in which a part thereof is exposed from the front surface of the housing 102.

The nozzle unit 2 is adhered to an upper surface 102A of the housing 102 via an adhesive member (e.g., double-sided tape) 25. The nozzle 22 of the nozzle unit 2 has a communication portion 22A, an extending portion 22B, and an ejecting portion 22C. The communication portion 22A is a portion that communicates with a pipeline outlet 94 of the pipeline 92. An inlet port 23 into which high-pressure air flows is provided in the communication portion 22A. The extending portion 22B is a portion that communicates the communication portion 22A and the ejecting portion 22C. The ejecting portion 22C is a portion from which high-pressure air is ejected. The ejecting portion 22C is provided with an ejecting port 24 which opens horizontally (e.g., in a rectangular shape or in an elliptical shape, etc.). The high-pressure air flowing into the inlet port 23 of the communication portion 22A passes through a communication passage formed in the communication portion 22A, the extending portion 22B, and the ejecting portion 22C and is ejected from the ejecting port 24 of the ejecting portion 22C.

The joint member 3 is connected to a pipeline inlet 93 of the pipeline 92 of the camera bracket 91. The joint member 3 in this example is formed integrally with the camera bracket 91. Meanwhile, the joint member 3 and the camera bracket 91 may be prepared as separate parts and may be combined with each other at the time of assembly.

The in-vehicle camera 100 and the nozzle unit 2 having such a configuration are assembled to the camera bracket 91 in the following procedure. First, the nozzle 22 is adhered to the upper surface 102A of the in-vehicle camera 100 by the adhesive member 25. In this case, the ejecting port 24 of the nozzle 22 is adjusted and adhered so as to face the center point of the in-vehicle camera 100. Subsequently, the connector part 103 of the in-vehicle camera 100 is inserted into the opening portion 95 of the camera bracket 91. In the in-vehicle camera 100, the portion on the side of the lens 101 is rotated in a direction of the upper surface 102A of the in-vehicle camera 100 about the end portion on the side of the connector part 103 inserted, and the nozzle 22 adhered to the upper surface 102A is brought close to the pipeline 92 of the camera bracket 91. As the in-vehicle camera 100 is further rotated, the pipeline outlet 94 of the nozzle-side connecting portion 92B of the pipeline 92 is inserted into the inlet port 23 of the communication portion 22A of the nozzle 22, and the nozzle 22 communicates with the pipeline 92. In this state, for example, an engaging portion of the camera bracket 91 is engaged with an engaging portion of the in-vehicle camera 100, so that the assembly is completed.

Meanwhile, the nozzle unit 2 may be formed integrally with the camera bracket 91. In this case, the nozzle unit 2 is assembled integrally with the camera bracket 91 so that an assembly path through which the in-vehicle camera 100 can be assembled into the opening portion 95 is secured with respect to the opening portion 95 of the camera bracket 91.

As shown in FIG. 7, a sectional area of the pipeline outlet 94 of the nozzle-side connecting portion 92B is smaller than that of the inlet port 23 of the communication portion 22A. Therefore, in a state in which the nozzle 22 communicates with the pipeline 92, gaps 96A, 96B are formed between an outer peripheral surface of the nozzle-side connecting portion 92B and an inner peripheral surface of the communication portion 22A. The gap 96A communicates with a communication passage 71 in the nozzle 22 via an opening 97, and the gap 96B communicates with the communication passage 71 via an opening 98. A sectional area d1 of the opening 97 and a sectional area d2 of the opening 98 are smaller than that of the ejecting port 24 of the nozzle 22, respectively.

The in-vehicle camera 100 assembled to the camera bracket 91 is attached to the rear bumper panel 200b by being fitted into the hole 210 formed in the rear bumper panel 200b. High-pressure air is sent from the joint member 3 to the nozzle 22 through the pipeline 92 and is injected toward the lens 101.

According to this configuration, the high-pressure air generated by the high-pressure air generation unit 5 can pass from the inside to the outside of the rear bumper panel 200b via the pipeline 92 provided in the camera bracket 91. Therefore, it is not necessary to form a dedicated hole for passing the high-pressure air in the rear bumper panel 200b. In this way, the work efficiency when attaching the foreign matter removal device 1 to the vehicle V is enhanced. Meanwhile, the expression "passing from the inside to the outside of the body panel" in this example means that the high-pressure air moves from the internal space to the external space of the panel member such as the above-described rear bumper panel.

Further, the high-pressure air passes from the high-pressure air generation unit 5 in the order of the hose 4, the joint member 3 and the pipeline 92, and can pass from the inside to the outside of the rear bumper panel 200b while maintaining its flow velocity.

Further, when assembling the in-vehicle camera 100 with the nozzle 22 attached thereto to the camera bracket 91, the pipeline outlet 94 of the pipeline 92 having a small sectional area is inserted into the inlet port 23 of the nozzle 22 having a large sectional area so as to communicate the nozzle 22 and the pipeline 92 with each other. According to this configuration, the assembly work for communicating the nozzle 22 with the pipeline 92 is facilitated, so that the work efficiency is improved. Further, when assembling the in-vehicle camera 100 to the camera bracket 91, the communication portion 22A of the nozzle 22 can be assembled without contacting the nozzle-side connecting portion 92B of the pipeline 92. In this way, it is possible to prevent the position of the nozzle 22 from being deviated from the lens 101. Further, since there is little leakage of air when the high-pressure air moves from the pipeline 92 to the nozzle 22, it is possible to reduce the pressure loss when the high-pressure air moves from the pipeline 92 to the nozzle 22.

Further, since the joint member 3 is formed integrally with the camera bracket 91, an operation of attaching the joint member 3 to the pipeline 92 is omitted. Accordingly, the work efficiency when attaching the foreign matter removal device 1 to the vehicle V is further improved.

Further, since the nozzle unit 2 is formed integrally with the camera bracket 91, it is not necessary to prepare a dedicated bracket for attaching the nozzle unit 2 to the rear bumper panel 200b. In this way, the versatility during attachment is improved, and the work efficiency when attaching the foreign matter removal device 1 to the vehicle V is further improved.

Further, since the nozzle unit 2 can be attached by the double-side tape 25, it is not necessary to prepare a dedicated bracket for attaching the nozzle unit 2 to the rear bumper panel 200*b*. In this way, the versatility during attachment is improved, and the work efficiency when attaching the foreign matter removal device 1 to the vehicle V is further improved.

Further, since the foreign matter removal device 1 having such a configuration is mounted on the vehicle V, foreign matters on the lens can be removed by blowing high-pressure air thereto, for example, even when the lens 101 of the in-vehicle camera 100 becomes dirty due to rain, mud or the like.

Next, a modified example of the pipeline (through-hole) 92 formed in the camera bracket 91 will be described with reference to FIGS. 8A and 8B.

Figure 8A:
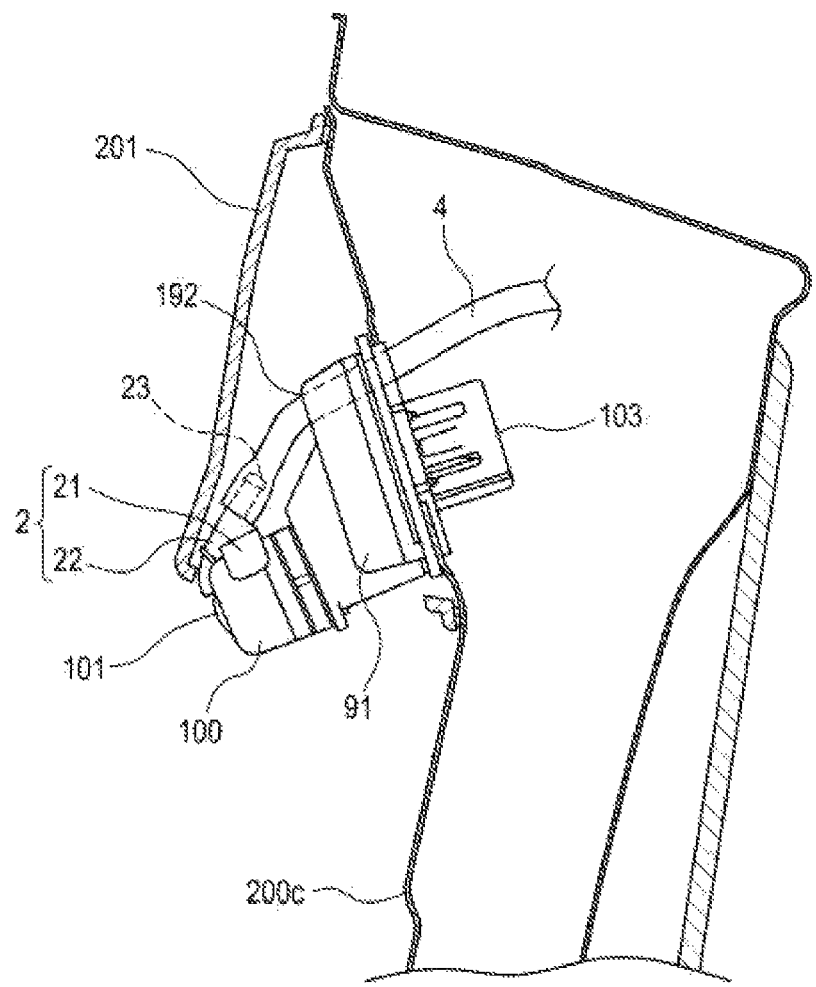
FIGS. 8A and 8B are views for explaining a modified example of the camera bracket.
Figure 8B:
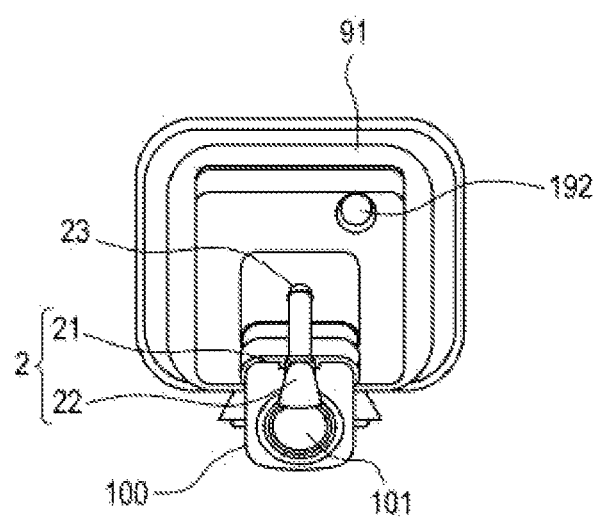

FIG. 8A shows a state in which the camera bracket 91 to which the in-vehicle camera 110 is assembled is attached to an outer panel 200*c* of the rear bumper 200B. FIG. 8B shows a through-hole 192 formed in the camera bracket 91.

The through-hole 192 in the modified example is different from the pipeline (through-hole) 92 (see FIGS. 6A and 6B) formed so as to communicate the nozzle 22 and the joint member 3 with each other in that it is the through-hole 192 through which the hose 4 passes.

The through-hole 192 is formed so as to penetrate the camera bracket 91 in, for example, a direction substantially perpendicular to the surface where the camera bracket 91 is attached to the outer panel 200*c*. The hose 4 is configured to pass through the through-hole 192 formed in the camera bracket 91. One end of the hose 4 passing through the through-hole 192 is connected to the inlet port 23 of the nozzle 22 disposed outside the outer panel 200*c*. Further, the opposite end of the hose 4 is connected to a discharge port 50 of the high-pressure air generation unit (not shown) 5 disposed inside the outer panel 200*c*. The nozzle 22 is attached to the in-vehicle camera 100.

Meanwhile, in this example, a garnish 201 is provided so as to cover the in-vehicle camera 100 or the like which is disposed to protrude to the outside of the outer panel 200*c*.

According to this configuration, since the hose 4 passes from the inside to the outside of the outer panel 200*c* through the through-hole 192 of the camera bracket 91, it is possible to simply realize a configuration in which the high-pressure air generated inside the outer panel 200*c* passes to the outside of the outer panel 200*c*. Therefore, the work efficiency when attaching the foreign matter removal device 1 to the vehicle V is enhanced.

Meanwhile, as described above, the nozzle unit 2 may be formed integrally with the camera bracket 91. In this case, the nozzle unit 2 may be assembled integrally with the camera bracket 91 so that an assembly path through which the in-vehicle camera 100 can be assembled into the opening portion 95 is secured with respect to the opening portion 95 of the camera bracket 91.

Figure 9:
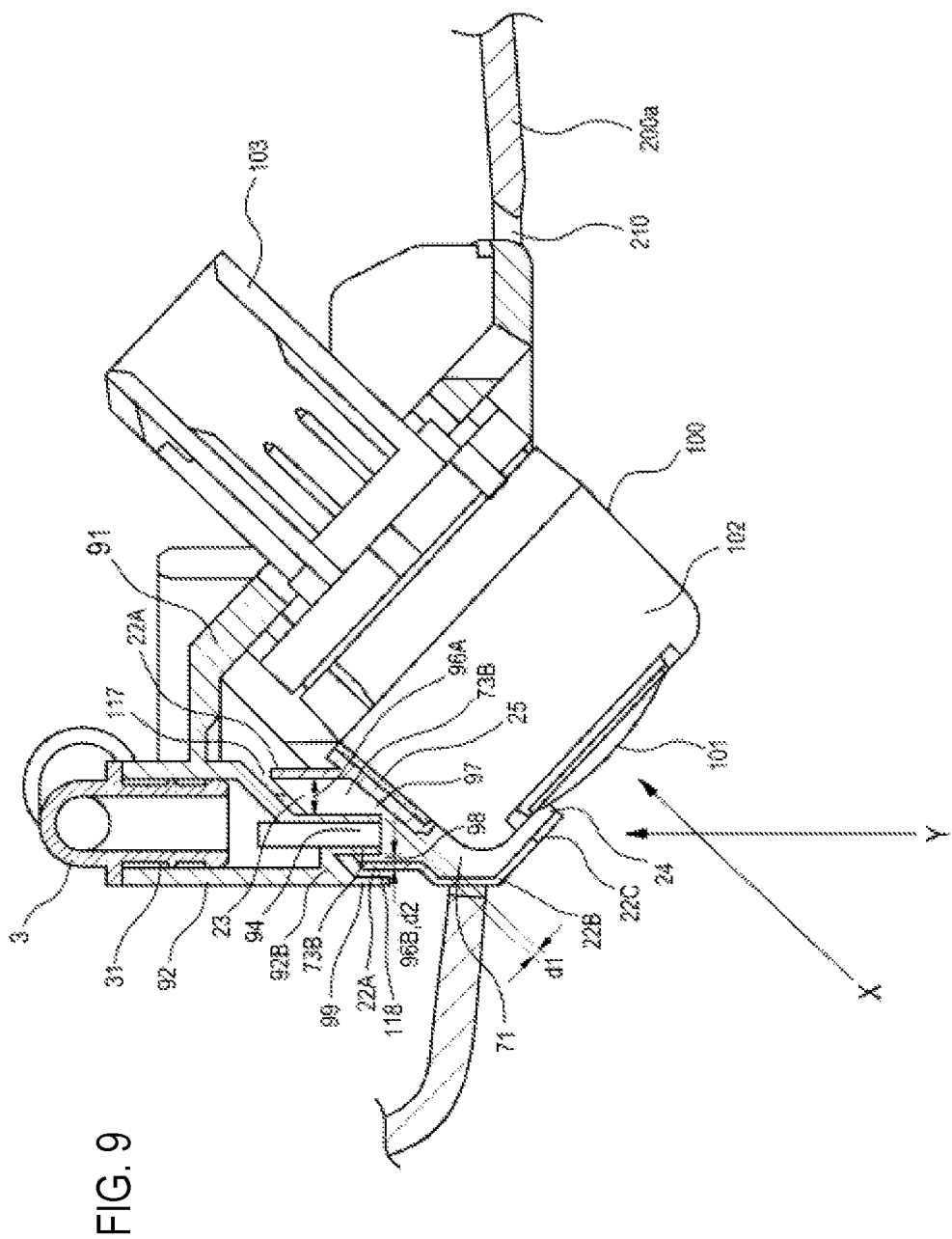
FIG. 9 is a longitudinal sectional view taken along the line C-C in FIG. 6B.

As shown in FIG. 9, a sectional area of the pipeline outlet 94 of the nozzle-side connecting portion 92B is smaller than that of the inlet port 23 of the communication portion 22A. When the in-vehicle camera 100 is assembled to the camera bracket 91, a part of the nozzle-side connecting portion 92B close to the pipeline outlet 94 is inserted into the inlet port 23 of the communication portion 22A. In a state in which the nozzle 22 communicates with the pipeline 92, the gaps 96A, 96B are formed between the outer peripheral surface of the nozzle-side connecting portion 92B and the inner peripheral surface of the communication portion 22A. The gap 96A communicates with the communication passage 71 in the nozzle 22 via the opening 97 formed between a tip end portion (wall of the pipeline outlet 94) of the nozzle-side connecting portion 92B and the inner side of the communication portion 22A, and the gap 96B communicates with the communication passage 71 via the opening 98 formed in the same manner.

In the communication passage 71, a part of the communication passage 71 close to the ejecting port 24 is formed by a wall of the nozzle 22 (the extending portion 22B and the ejecting portion 22C) and a shoulder portion of the front surface of the housing 102, and the like. The sectional area d1 of the opening 97 and the sectional area d2 of the opening 98 are smaller than that of the ejecting port 24 of the nozzle 22.

A cover portion (an example of the rib) 99 is formed at a tip end portion of the pipeline 92. The cover portion 99 constitutes a part of the nozzle-side connecting portion 92B and is formed at an outer peripheral side of the pipeline outlet 94. In a state in which the nozzle 22 communicates with the pipeline 92, the cover portion 99 is disposed outside the communication portion 22A of the nozzle 22 so as to cover the communication portion 22A while leaving a gap approximately equal to the gap 96B.

The gap 96B communicates with the gap formed by the cover portion 99 and communicates with the outside of the nozzle 22 through an opening 118 formed between a tip end portion of the cover portion 99 and the communication portion 22A of the nozzle 22. The gap 96A communicates with the outside of the nozzle 22 via an opening 117 formed between the inner side of the nozzle-side connecting portion 92B and a tip end portion (wall of the inlet port 23) of the communication portion 22A. The gap 96A forms a bypass path together with the opening 97 and the opening 117, and the gap 96B forms a bypass path together with the opening 98 and the opening 118. These bypass paths communicate the communication passage 71 and the outside of the nozzle 22 with each other.

The in-vehicle camera 100 assembled to the camera bracket 91 is attached to the rear bumper panel 200*b* by being fitted into the hole 210 formed in the rear bumper panel 200*b*. High-pressure air is sent from the joint member 3 to the nozzle 22 through the pipeline 92 and is injected toward the lens 101.

Figure 10A:
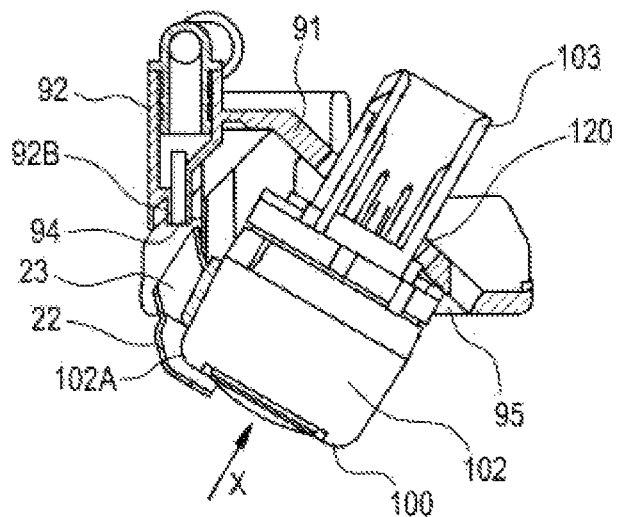
FIGS. 10A, 10B and 10C are views for explaining a procedure of assembling the camera bracket.
Figure 10B:
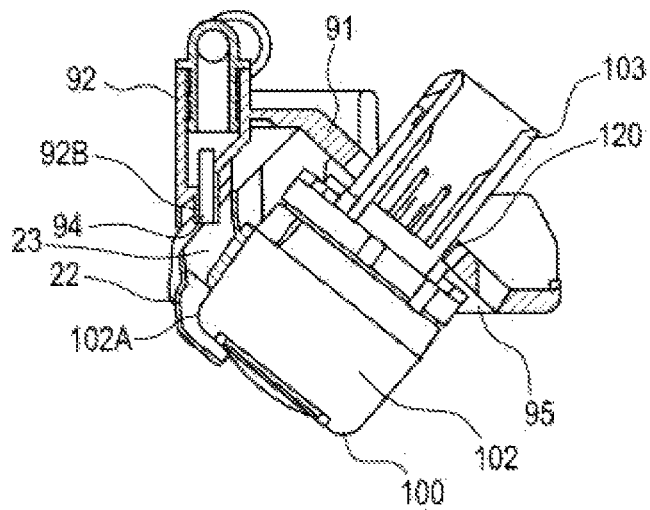
Figure 10C:
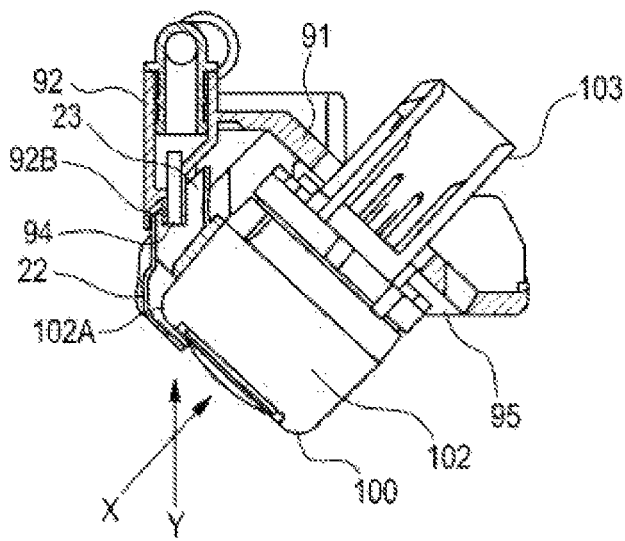

The in-vehicle camera 100 having such a configuration is assembled to the camera bracket 91 according to the procedures shown in FIGS. 10A to 10C.

As a preparation step, the nozzle 22 is adhered to the upper surface 102A of the in-vehicle camera 100 by the adhesive member 25. In this case, the ejecting port 24 of the nozzle 22 is adjusted and adhered so as to face the center point of the in-vehicle camera 100.

First, as shown in FIG. 10A, the in-vehicle camera 100 is inserted into the camera bracket 91 (in a direction of arrow X) through the opening portion 95 of the camera bracket 91. At this time, the connector part 103 of the in-vehicle camera 100 is inserted into an opening 120 formed in a rear wall of the camera bracket 91. In this example, the direction of the arrow X is set as the attachment direction when the in-vehicle camera 100 is attached to the rear bumper panel 200*b*.

Subsequently, as shown in FIG. 10B, in the in-vehicle camera 100, the side of the lens 101 of the in-vehicle camera 100 is rotated in a direction of the upper surface 102A of the in-vehicle camera 100 about the tip end side of the connector part 103 inserted. In this way, the nozzle 22 adhered to the upper surface 102A of the housing 102 is brought close to the pipeline 92 of the camera bracket 91. In this example, the direction of the arrow Y is set as the communication direction when the nozzle 22 and the pipeline 92 are communicated with each other. In this example, the attachment direction X and the communication direction Y intersect with each other (see FIG. 10C).

Subsequently, as shown in FIG. 10C, when the in-vehicle camera 100 is further rotated in the communication direction, the nozzle-side connecting portion 92B of the pipeline 92 is inserted into the inlet port 23 of the communication portion 22A of the nozzle 22, and the nozzle 22 communicates with the pipeline 92.

In this state, for example, an engaging portion of the camera bracket 91 is engaged with an engaging portion of the in-vehicle camera 100, so that the assembly is completed.

According to this configuration, since the nozzle unit 2 is attached to the housing 102 of the in-vehicle camera 100, the nozzle 22 of the nozzle unit 2 and the pipeline 92 are communicated with each other when the in-vehicle camera 100 is attached to the rear bumper panel 200b of the vehicle V. Since the inlet port 23 of the nozzle 22 is larger than the pipeline outlet 94 of the pipeline 92, the nozzle 22 and the pipeline 92 are difficult to come into contact with each other when the nozzle-side connecting portion 92B of the pipeline 92 is inserted into the inlet port 23 of the nozzle 22. Further, according to the above configuration, since there is little leakage of air when the high-pressure air moves from the pipeline 92 to the nozzle 22, it is possible to reduce the pressure loss when the high-pressure air moves from the pipeline 92 to the nozzle 22. Moreover, the positioning of the nozzle 22 of the nozzle unit 2 with respect to the lens 101 of the in-vehicle camera 100 is completed when the nozzle unit 2 is attached to the housing 102 of the in-vehicle camera 100. Therefore, an assembly worker can perform an operation of attaching the in-vehicle camera 100 to the rear bumper panel 200b without worrying about the positioning accuracy between the nozzle 22 and the lens 101. In this way, it is possible to improve the work efficiency when attaching the foreign matter removal device to the vehicle while maintaining the performance of removing foreign matters.

Further, the high-pressure air generated by the high-pressure air generation unit 5 can pass from the inside to the outside of the rear bumper panel 200b via the pipeline 92 provided in the camera bracket 91. Therefore, it is not necessary to form a dedicated hole for passing the high-pressure air in the rear bumper panel 200b. In this way, the work efficiency when attaching the foreign matter removal device 1 to the vehicle V is enhanced. Meanwhile, the expression "passing from the inside to the outside of the body panel" in this example means that the high-pressure air moves from the internal space to the external space of the panel member such as the above-described rear bumper panel.

By the way, in the case where the attachment direction X when the in-vehicle camera 100 is attached to the rear bumper panel 200b, and the communication direction Y when the nozzle 22 and the pipeline 92 are communicated with each other intersect with each other, the nozzle 22 and the pipeline 92 are more likely to come into contact with each other, as compared with a case where the attachment direction X and the communication direction Y coincide.

On the contrary, according to the configuration of the present embodiment, since the inlet port 23 of the nozzle 22 is formed larger than the pipeline outlet 94 of the pipeline 92, the nozzle 22 and the pipeline 92 are difficult to come into contact with each other, so that the efficiency of the assembly work can be improved.

Further, even when the clogging of the ejecting port 24 of the nozzle temporarily occurs, the air intake for generating high-pressure air can be performed by using the gaps 96A, 96B because the gaps 96A, 96B between the outer peripheral surface of the pipeline 92 and the inner peripheral surface of the nozzle 22 can function as a bypass path.

Further, since the cover portion 99 is formed at the tip end portion of the pipeline 92, water hardly intrudes into the gap 96B and it is easy to maintain the performance of removing foreign matters even in rainy weather or the like.

Further, since the in-vehicle camera 100 is attached to the camera bracket 91 in advance, the efficiency of the operation of attaching the in-vehicle camera 100 to the rear bumper panel 200b is improved.

Further, since the foreign matter removal device 1 having such a configuration is mounted on the vehicle V, foreign matters on the lens can be removed by blowing high-pressure air thereto, for example, even when the lens 101 of the in-vehicle camera 100 becomes dirty due to rain, mud or the like.

Second Embodiment

Next, a second embodiment will be described.

Figure 11A:
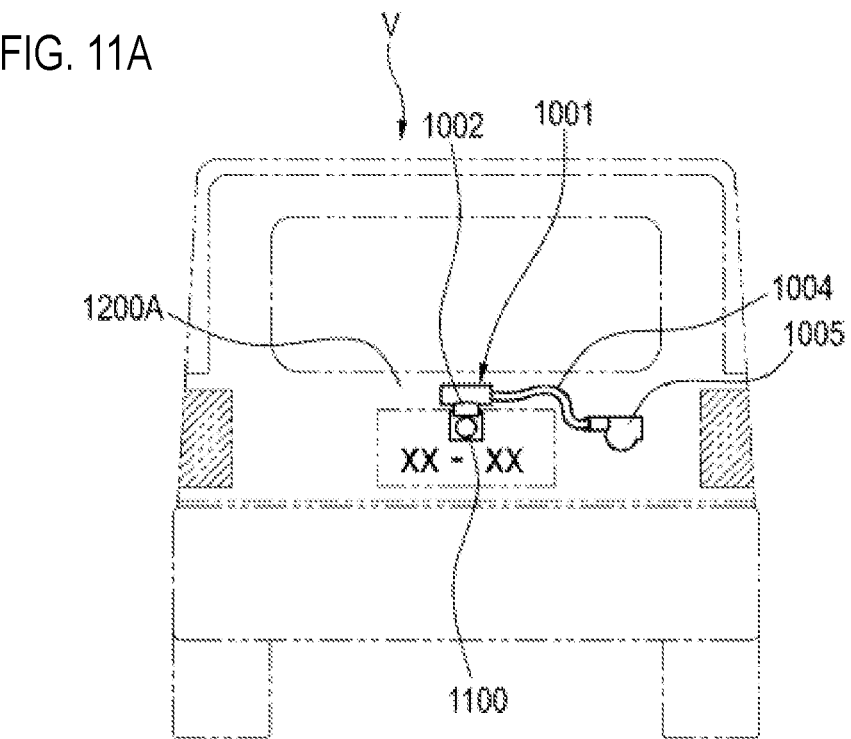
FIG. 11A is a rear view (a foreign matter removal device is shown in a perspective view) of a vehicle.
Figure 11B:
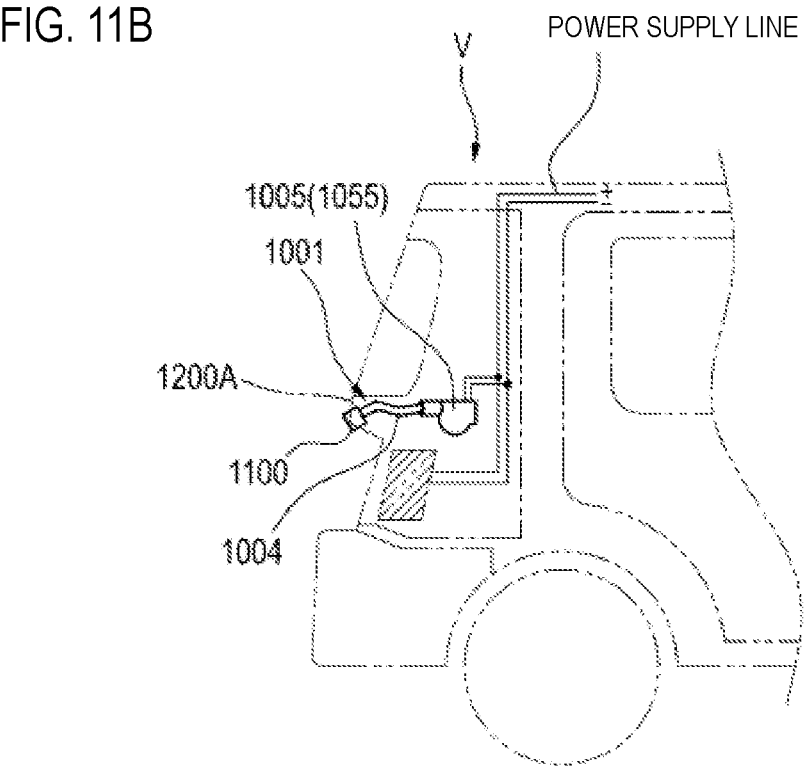
FIG. 11B is a side view (the foreign matter removal device is shown in a perspective view) of a rear part of the vehicle.

As shown in FIGS. 11A and 11B, a foreign matter removal device 1001 is attached to a back door 1200A of the vehicle V, for example. The foreign matter removal device 1001 is provided with a drive source 1055, and a power supply terminal of the drive source 1055 is connected to a power supply line of the vehicle V. For example, with the triggering that a gear of the vehicle V enters a reverse mode, a vehicle control unit (ECU; not shown) causes an in-vehicle camera 1100 (to be described later) to start photographing, and the foreign matter removal device 1001 is controlled to operate by the vehicle control unit (ECU) within several seconds at the start of photographing, for example.

The foreign matter removal device 1001 includes a nozzle unit 1002, a hose 1004, and a high-pressure air generation unit (an example of the generation unit) 1005. The hose 1004 is a piping member that connects the nozzle unit 1002 and the high-pressure air generation unit 1005. The high-pressure air generation unit 1005 is a unit for generating high-pressure air to be fed to a nozzle 1022. The high-pressure air generation unit 1005 is attached to a part of a vehicle body at the inside of the vehicle V.

Figure 12A:
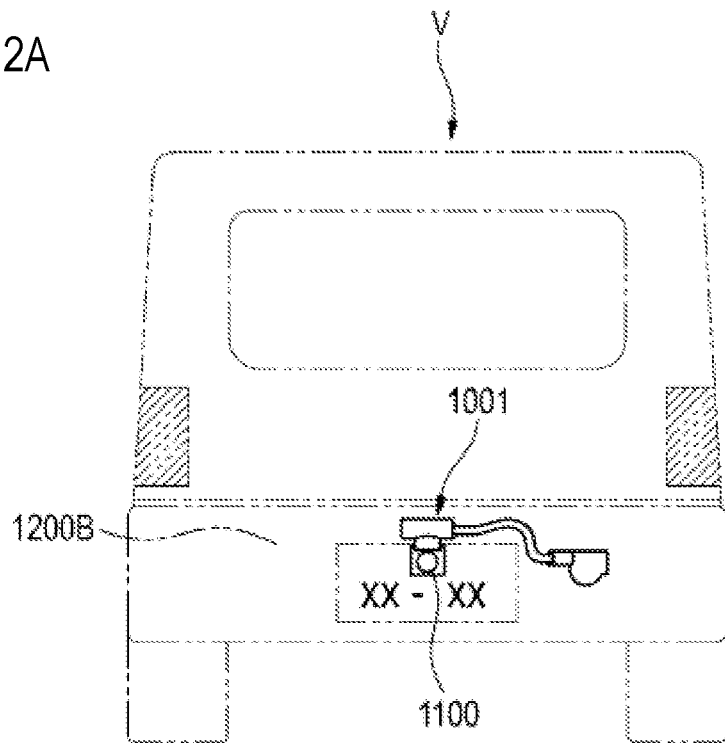
FIGS. 12A and 12B are views showing another example of the position where the foreign matter removal device is attached.
Figure 12B:
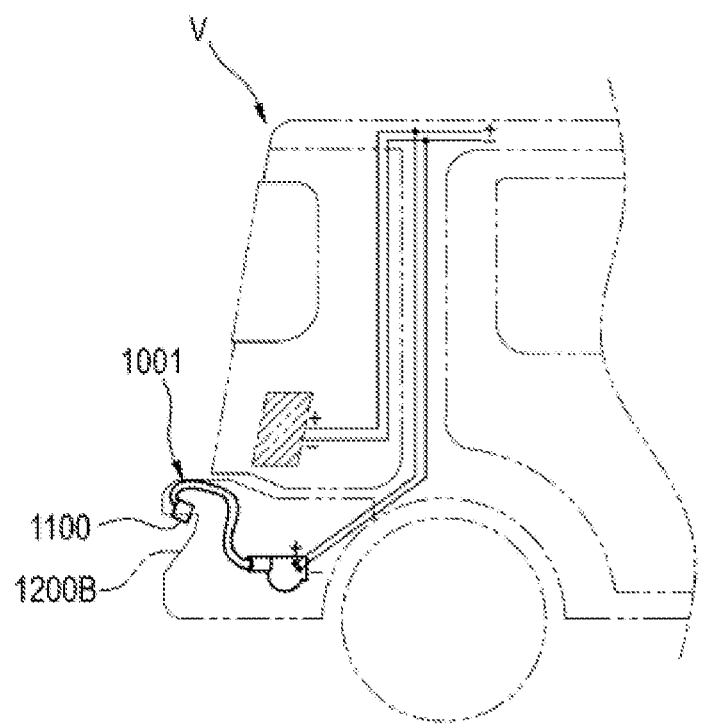

Meanwhile, as shown in FIGS. 12A and 12B, the foreign matter removal device 1001 may be attached to a rear bumper 1200B of the vehicle V, for example.

Figure 13:
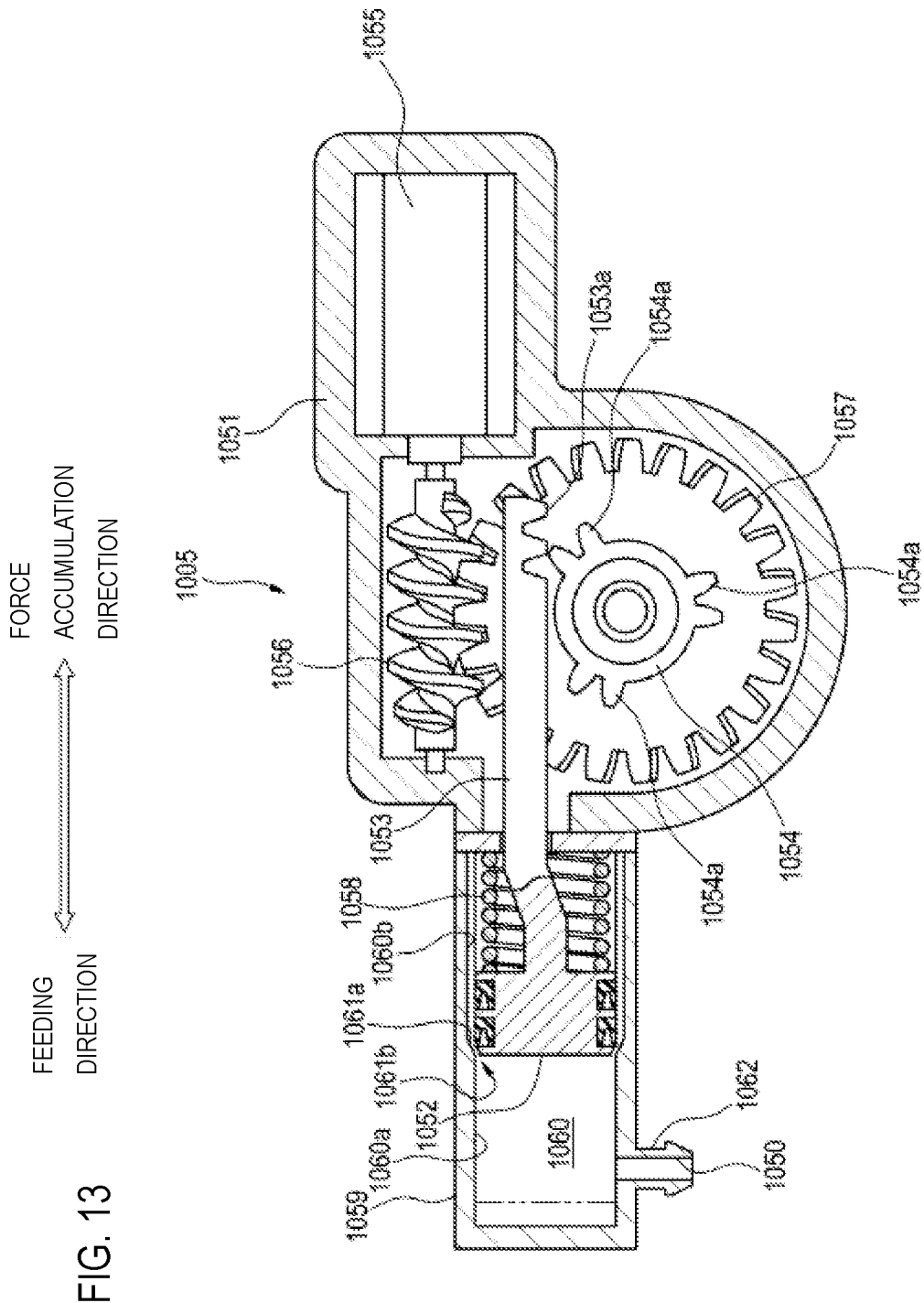
FIG. 13 is configuration view of a high-pressure air generation unit included in a foreign matter removal device according to a second embodiment.

As shown in FIG. 13, the high-pressure air generation unit 1005 includes a case body 1051 and a moving mechanism disposed inside the case body 1051. Of a moving direction of a piston 1052 in the high-pressure air generation unit 1005, a rearward direction that is a direction of feeding out air refers to a feeding direction, and a forward direction that is opposite to the feeding direction refers to a force accumulation direction.

In an initial state before high-pressure air is fed out, the piston 1052 is positioned on the feeding direction side, and a rack 1053 is positioned in a state where a rack portion 1053a is engageable with a gear portion 1054a of a pinion 1054.

When the driving of the motor (driving source) 1055 is started and a driving force of the motor 1055 is transmitted to a worm wheel 1057 via a worm 1056, the gear portion 1054*a* of the pinion 1054 is meshed with the rack portion 1053*a* of the rack 1053. Therefore, the rack 1053 moves in the force accumulation direction against an urging force of an urging spring 1058 in accordance with the rotation of the pinion 1054. As the rack 1053 moves in the force accumulation direction, the meshing between the gear portion 1054*a* and the rack portion 1053*a* is released at a predetermined position. The position where the meshing between the gear portion 1054*a* and the rack portion 1053*a* is released is set as the bottom dead center of the piston 1052. In a state in which the piston 1052 is positioned at the bottom dead center, the air (outside air) flowing into a substantially front half portion (second space) 1060*b* of an internal space 1060 of a piston support portion 1059 passes through a gap 1061*b* along a step 1061*a* and flows toward a substantially rear half portion (first space) 1060*a* of the internal space 1060.

When the piston 1052 is moved to the bottom dead center, the meshing between the gear portion 1054*a* and the rack portion 1053*a* is released, and the piston 1052 is moved in the feeding direction at a speed higher than the moving speed in the force accumulation direction by an urging force of the urging spring 1058. In this way, the air flowing from the second space 1060*b* to the first space 1060*a* passes through a discharge port 1050 of a connection protrusion 1062 from the first space 1060*a* and is fed toward the nozzle 1022 of the nozzle unit 1002 via the hose 1004. At this time, since the diameter of the discharge port 1050 is smaller than that of the piston support portion 1059, the air discharged from the first space 1060*a* through the discharge port 1050 is compressed into high-pressure air and is fed out.

Figure 14:
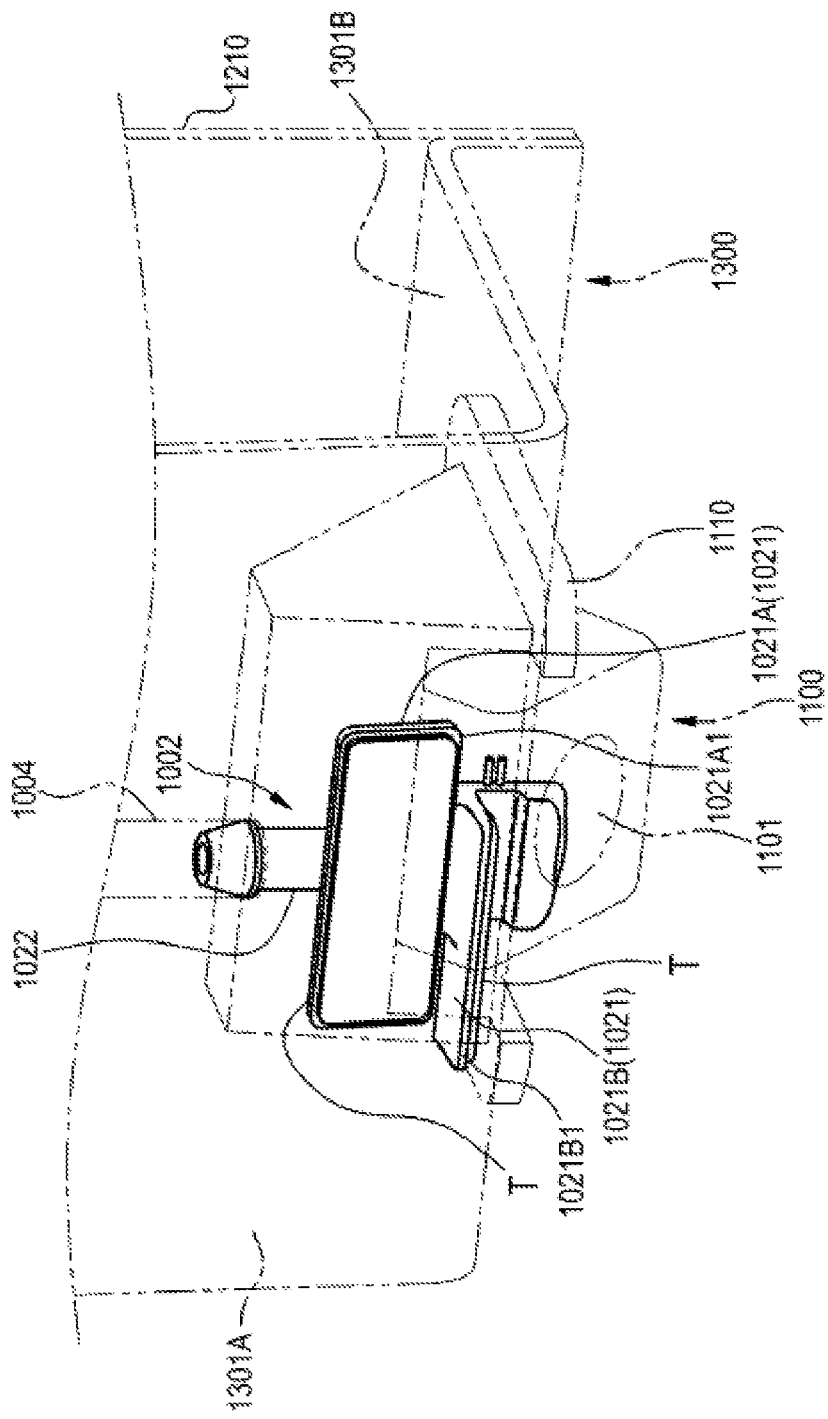
FIG. 14 is a perspective view showing an in-vehicle camera and a nozzle unit attached to a garnish.

The in-vehicle camera 1100 is a camera for confirming, for example, the rear side of a vehicle. As shown in FIG. 14, the in-vehicle camera 1100 is attached to a garnish 1300 (an example of the vehicle body panel) provided outside a body panel 1210 constituting the back door 1200A via a camera attaching member 1110. In this way, the in-vehicle camera 1100 is disposed such that a lens 1101 of the in-vehicle camera 1100 is exposed toward the outside of the garnish 1300. The in-vehicle camera 1100 is provided with an imaging unit (not shown), and the lens 1101 covers the imaging unit. As the lens 1101, a simple translucent cover that does not converge or diffuse light is also included in the lens of this example. Meanwhile, the position at which the in-vehicle camera 1100 is attached is not limited to the rear end side of the vehicle but may be a body panel such as the front side or lateral side of the vehicle. Further, the in-vehicle camera 1100 may be attached to the vehicle body via a vehicle mounted component such as a lamp, a door knob, a mirror, a bumper attached to the body panel, or the in-vehicle camera 1100 may be mounted as a part (as an integral body) of these components.

As shown in FIG. 14, the nozzle unit 1002 is attached to inner surfaces (surfaces facing the body panel 1210) 1301A, 1301B of the garnish 1300 and is provided with an attachment part 1021 and the nozzle 1022. The nozzle unit 1002 is formed of resin material, for example.

The garnish 1300 is formed in a substantially L shape in which a first surface 1301*a* (see FIG. 16) having the inner surface 1301A extends in a direction substantially along the upper and lower direction of the vehicle, and a second surface 1301*b* (see FIG. 16) having the inner surface 1301B extends in a direction substantially along the horizontal direction of the vehicle. The attachment part 1021 has a first attachment part 1021A and a second attachment part 1021B. The first attachment part 1021A protrudes laterally from the nozzle 1022 and has a first adhesive surface 1021A1 that is bonded to the first surface 1301*a* (the inner surface 1301A) of the garnish 1300 by an adhesive tape T. The second attachment part 1021B protrudes downward from the first attachment part 1021A and has a second adhesive surface 1021B1 that is bonded to the second surface 1301*b* (the inner surface 1301B) of the garnish 1300 by the adhesive tape T. Meanwhile, the first attachment part 1021A and the second attachment part 1021B may adopt a bonding method using adhesion by an adhesive or engagement by screwing or the like, in addition to the bonding method using the adhesive tape T such as a double-sided tape.

The nozzle 1022 injects high-pressure air toward the lens 1101 of the in-vehicle camera 1100. The nozzle 1022 is formed integrally with the attachment part 1021. When the attachment part 1021 is attached to the garnish 1300, the nozzle 1022 is provided such that a tip end of the nozzle 1022 faces the lens 1101. Here, the expression, "formed integrally with," means that a worker can handle the nozzle 1022 and the attachment part 1021 as an integral part during assembly work. Specifically, for example, the nozzle 1022 and the attachment part 1021 may be molded of the same material and in the same mold. Alternatively, the nozzle 1022 and the attachment part 1021 may be respectively molded of separate materials, and then, fitted together and formed integrally, thereby constituting the nozzle unit 1002.

Figure 15:
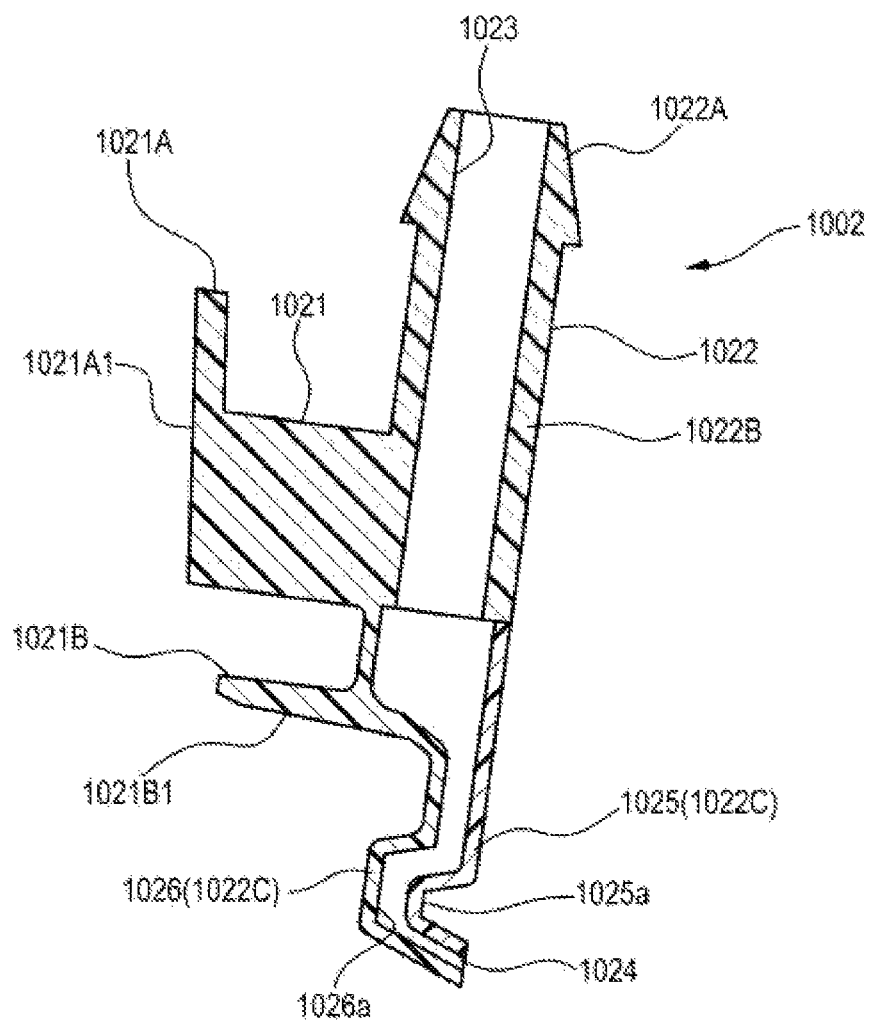
FIG. 15 is a sectional view of the nozzle unit.

As shown in FIG. 15, the nozzle 1022 includes a connecting portion 1022A, an extending portion 1022B, and an ejecting portion 1022C. The connecting portion 1022A is a portion to which the hose 1004 is connected. The connecting portion 1022A is provided with an inlet port 1023 into which high-pressure air flows. The extending portion 1022B is a portion that communicates the connecting portion 1022A and the ejecting portion 1022C with each other. The ejecting portion 1022C is a portion from which high-pressure air is ejected.

Figure 16:
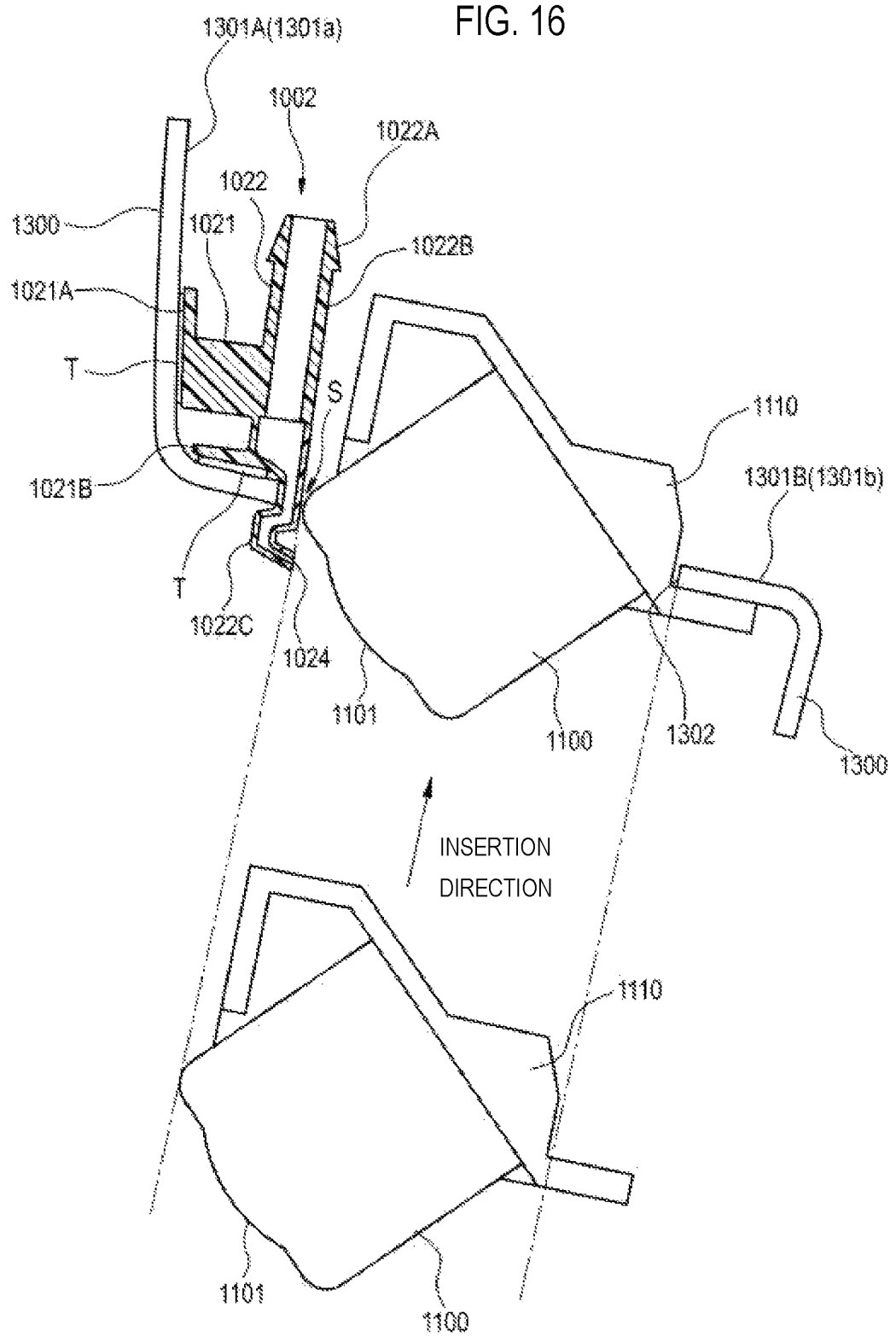
FIG. 16 is a sectional view showing an example of attachment of the nozzle unit and the in-vehicle camera to the garnish.

The ejecting portion 1022C has an opening shape which is bent to the opposite side of the side facing the lens 1101 and then is bent again toward the side of the lens 1101. That is, the ejecting portion 1022C is formed in a substantially S shape and is disposed such that an ejecting port 1024 provided at a tip end thereof faces the front surface of the lens 1101, as shown in FIG. 16. The high-pressure air flowing into the inlet port 1023 of the connecting portion 1022A passes through a communication passage formed in the extending portion 1022B and is ejected from the ejecting port 1024 of the ejecting portion 1022C.

As shown in FIG. 16, in an opening portion 1302 of the garnish 1300, a constant gap S is formed between the garnish 1300, and the in-vehicle camera 1100 and the camera attaching member 1110 attached to the garnish 1300. The ejecting portion 1022C of the nozzle 1022 protrudes to the outside of the vehicle from the opening portion 1302 of the garnish 1300 through the gap S.

Figure 17A:
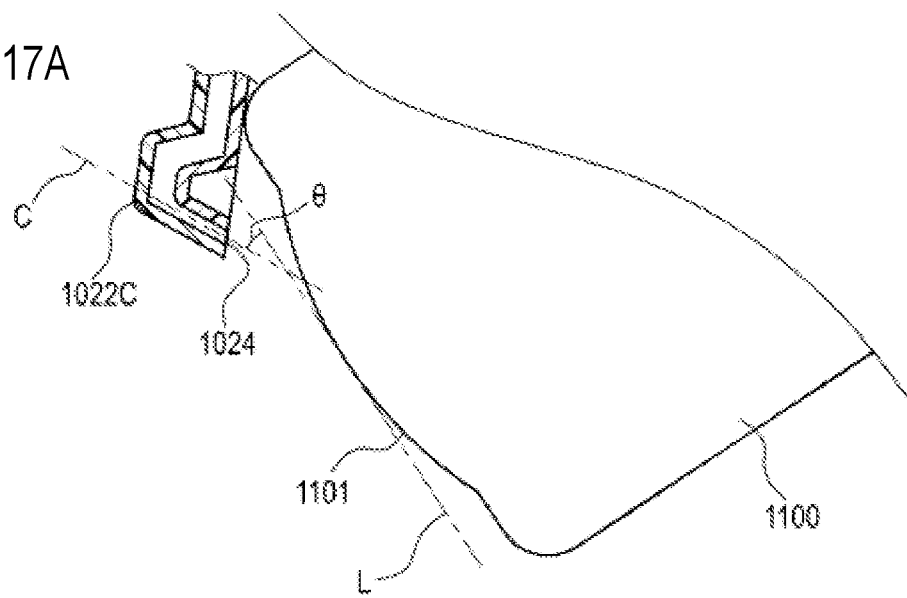
FIGS. 17A and 17B are schematic configuration views showing a positional relationship between a nozzle included in the foreign matter removal device and a lens of the in-vehicle camera.

As described above, the nozzle unit 1002 is configured to be removably attached to the in-vehicle camera 1100. However, as shown in FIG. 17A, when an angle formed by a line C passing through the center of the ejecting port 1024 of the nozzle 1022 and a tangential line L of the apex of the lens 1101 is defined as θ, the nozzle 1022 is positioned with respect to the lens 1101 so that the angle θ is 0° or more but 60° or less. Preferably, the angle θ is 5° or more but 30° or less. In this way, by arranging the ejecting port 1024 of the nozzle 1022 with respect to the lens 1101 while maintaining a predetermined slope, the high-pressure air can be easily blown onto the entire surface of the lens 1101, thereby enhancing the performance of removing water droplets. Meanwhile, in the case where the lens mounted on the in-vehicle camera is a planar lens (e.g., plano-concave lens) instead of the curved lens 1101 as in the present embodiment, a line along the surface of the planar lens is considered as the above tangential line L, and the nozzle 1022 may be positioned with respect to the planar lens so that the angle θ formed by the surface of the lens and the center line C of the ejecting port 1024 of the nozzle 1022 is 0° or more but 60° or less.

Figure 17B:
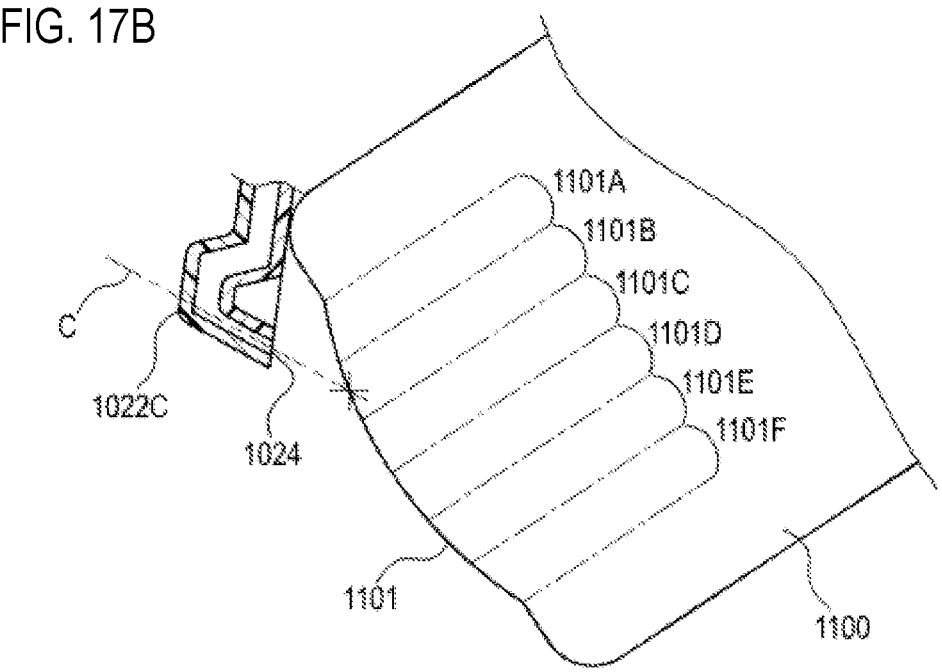

Further, as shown in FIG. 17B, when the lens 1101 is divided into six equal parts in the upper and lower direction, and a first region 1101A, a second region 1101B, a third region 1101C, a fourth region 1101D, a fifth region 1101E and a sixth region 1101F from the upper are defined, the center line C of the ejecting port 1024 of the nozzle 1022 intersects with the second region 1101B which is the second portion from the top of the lens 1011. In this way, by positioning the ejecting port 1024 of the nozzle 1022 toward a certain region (second region 101B) on the upper side of the lens 1101, the high-pressure air can be easily blown onto the entire surface of the lens 1101, thereby enhancing the performance of removing water droplets.

Figure 18A:
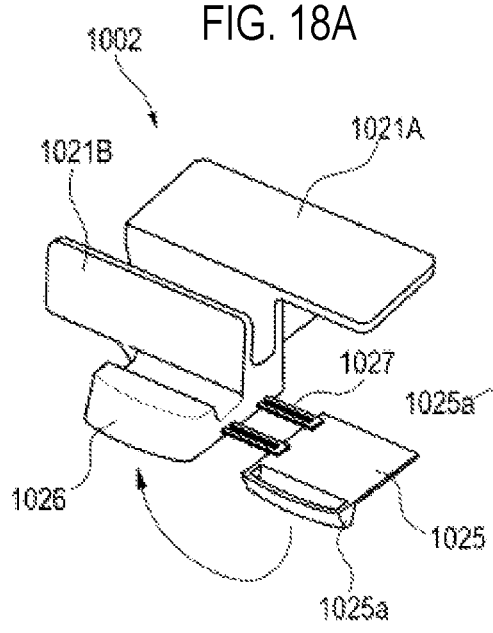
FIGS. 18A and 18B are perspective views showing a state in which an inner member and an outer member constituting the nozzle unit are not engaged.
Figure 18B:
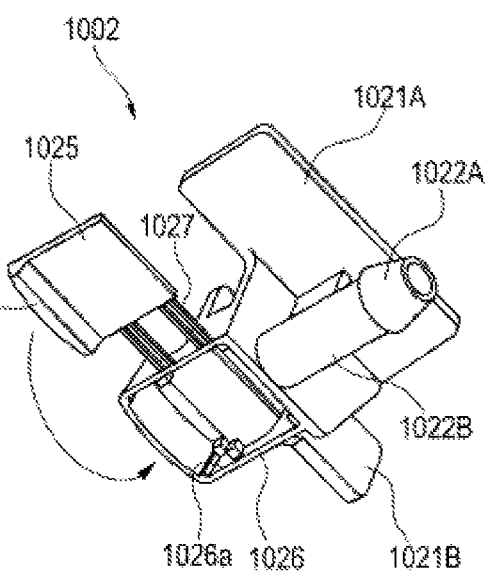
Figure 18C:
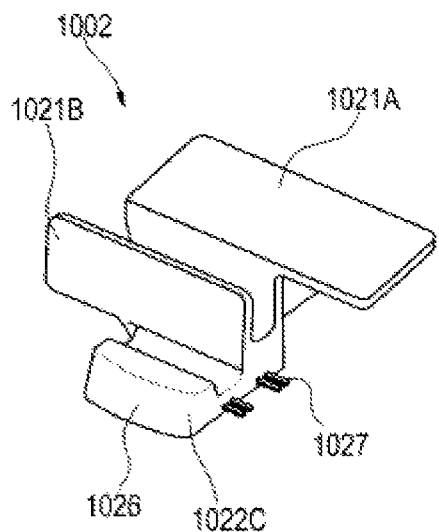
FIGS. 18C and 18D are perspective views showing a state in which the inner member and the outer member are engaged.
Figure 18D:
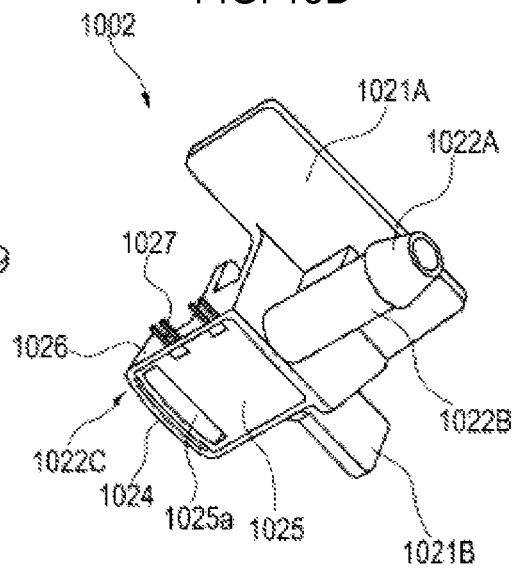

As shown in FIGS. 18A and 18B, the ejecting portion 1022C is composed of an inner member 1025, an outer member 1026, and a connecting portion 1027. The inner member 1025 constitutes one wall facing the lens 1101 in a state in which the nozzle unit 1002 is attached to the garnish 1300. The inner member 1025 has a projection 1025*a* protruding toward the outer member 1026. The outer member 1026 is disposed on the side opposite to the lens 1101 across the inner member 1025 and constitutes the other wall directly extending from the extending portion 1022B of the nozzle 1022. The outer member 1026 has a groove portion 1026*a* for receiving the projection 1025*a* of the inner member 1025. The connecting portion 1027 is a member that connects the inner member 1025 and the outer member 1026, and is composed of two paired wire portions having a small diameter. An outer shape of the inner member 1025 corresponds to that of the groove portion 1026*a* of the outer member 1026. As shown in FIGS. 18C and 18D, by bending the connecting portion 1027, the inner member 1025 is accommodated in the outer member 1026 (the inner member 1025 and the outer member 1026 are coupled) to form the ejecting portion 1022C having a hollow shape.

Next, the operation of the foreign matter removal device 1001 will be described with reference to FIGS. 11A, 11B and 13 again.

When the driving of the drive motor in the high-pressure air generation unit 1005 is started, first, air (outside air) for generating high-pressure air is sucked. The air is introduced from the ejecting port 1024 of the nozzle 1022, passes through the communication passage in the extending portion 1022B, and is sucked into the high-pressure air generation unit 1005 from the inlet port 1023. The sucked air is fed out, as high-pressure air, from the discharge port 1050 of the high-pressure air generation unit 1005 to the hose 1004 by piston motion due to an urging force of the urging spring 1058. The high-pressure air is fed from the hose 1004 to the nozzle 1022 of the nozzle unit 1002 through the joint member 1003.

The high-pressure air flows into the inlet port 1023 of the nozzle 1022 and is ejected from the ejecting port 1024 through the communication passage. The high-pressure air ejected from the ejecting port 1024 is blown toward the lens 1101 of the in-vehicle camera 1100. In this way, foreign matters such as water droplets, dirt, mud or the like adhering to the lens 1101 are blown away, so that the dirt of the lens 1011 is eliminated.

Figure 19:
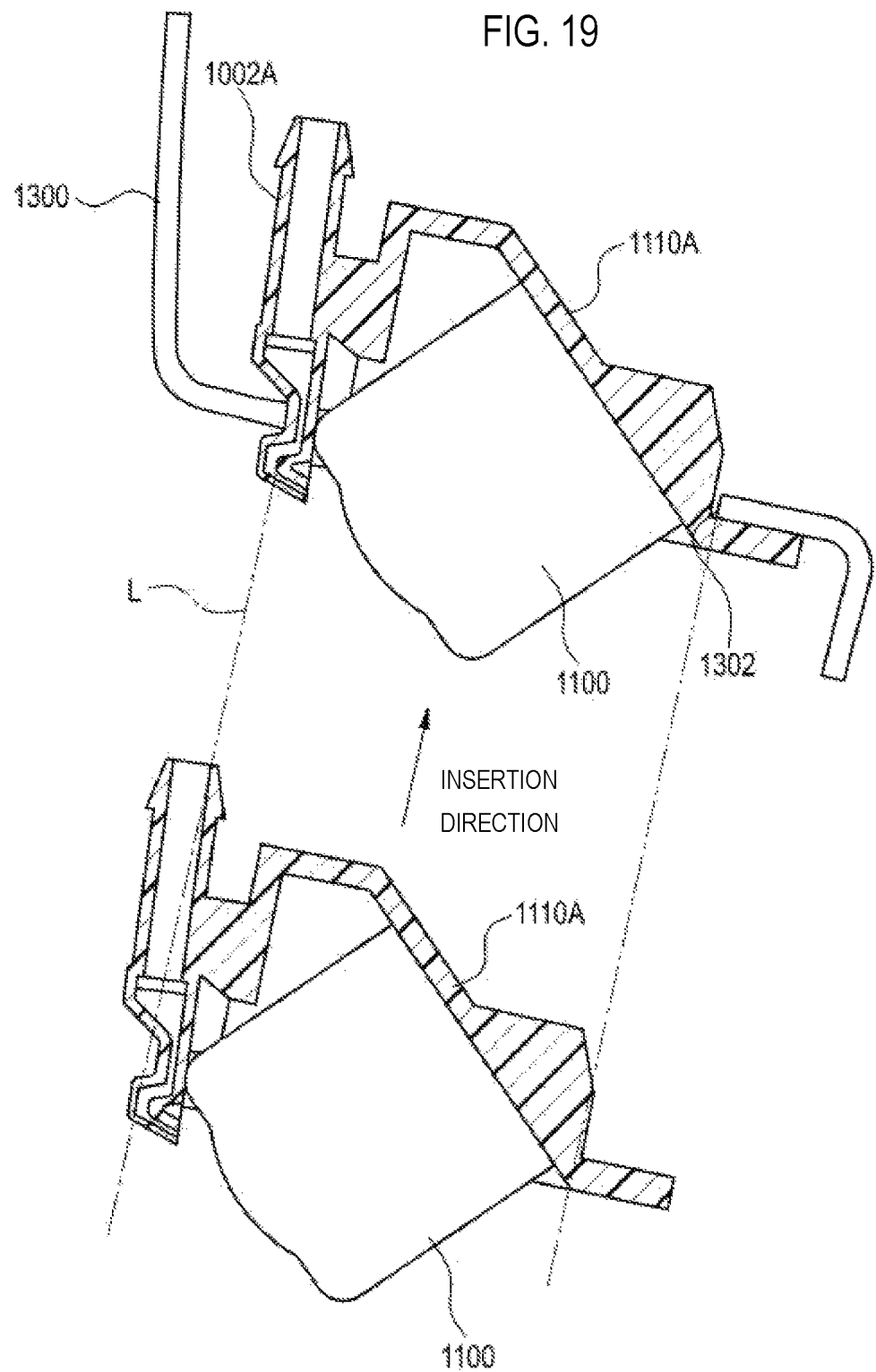
FIG. 19 is a sectional view showing an example of attachment of a nozzle unit-integrated bracket on which the in-vehicle camera is mounted to the garnish in a reference example.

By the way, in the configuration in which the nozzle unit 1002A is molded integrally with a dedicated bracket 1110A for attaching the in-vehicle camera 1100 to the garnish 1300 as in the foreign matter removal device shown in FIG. 19, the bracket 1110A including the nozzle unit 1002A interferes with the size of the opening portion 1302 of the garnish 1300 when the in-vehicle camera 1100 is attached to the garnish 1300 via the bracket 1110A after the garnish 1300 is attached to the body panel. Therefore, it is not possible to insert the bracket 1110A with the nozzle unit 1002A on which the in-vehicle camera 1100 is mounted from the opening portion 1302 of the garnish 1300 and attach it the garnish 1300. Thus, it is necessary to temporarily detach the garnish 1300 from the body panel or to enlarge or change the size of the opening portion 1302 of the garnish 1300. Accordingly, the versatility when attaching the in-vehicle camera 1100 or the nozzle unit 1002A to the vehicle is lowered.

On the contrary, according to the foreign matter removal device 1001 of the present embodiment, as shown in FIG. 16, the nozzle unit 1002 is attached to the inner surface of the garnish 1300, and the ejecting portion that is a tip end portion of the nozzle 1022 protrudes to the outside of the vehicle through the gap S formed between the garnish 1300 and the in-vehicle camera 1100 or the camera attaching member 1110 for attaching the in-vehicle camera 1100 to the garnish 1300 and is disposed toward the front surface of the lens 1101 of the in-vehicle camera 1100. Therefore, when attaching the in-vehicle camera 1100 and the nozzle unit 1002 to the vehicle, the nozzle unit 1002 is attached to the inner surfaces 1301A, 1302B (the first surface 1301*a* and the second surface 1302*b*) of the garnish 1300 in a state in which the garnish 1300 is attached to the body panel 1210, and then, the camera attaching member 1110 to which the in-vehicle camera 1100 is attached can be inserted from the opening portion 1302 of the garnish 1300 and attached to the body panel 1210. In this way, the ejecting portion 1022C can be placed without interfering with the in-vehicle camera 1100 and the camera attaching member 1110 attached to the garnish 1300. Accordingly, there is no need for post-processing to the garnish 1300 such as detaching the garnish 1300 from the body panel 1210 or enlarging or changing the opening portion 1302 of the garnish 1300 in order to attach the in-vehicle camera 1100 and the nozzle unit 1002. Thus, the versatility and work efficiency when attaching the foreign matter removal device 1001 to the vehicle are improved. Further, since the garnish 1300 itself does not need to secure water tightness, the in-vehicle camera 1100 and the nozzle unit 1002 can be attached to the garnish 1300 without providing a seal member or the like in the opening portion 1302 of the garnish 1300.

Further, the ejecting portion 1022C of the nozzle 1022 has an opening shape which is bent to the opposite side of the side facing the lens 1101 and then is bent again toward the side of the lens 1101. In this manner, by forming the ejecting portion 1022C bent in a substantially S shape, the optimum position of the ejecting port 1024 of the ejecting portion 1022C with respect to the lens 1101 of the in-vehicle camera 1100 can be secured even when the gap S between the garnish 1300 and the camera attaching member 1110 is narrow, so that the performance of removing foreign matters can be maintained.

Further, the ejecting portion 1022C includes the inner member 1025 facing the lens 1101 and the outer member 1026 disposed on the side opposite to the lens 1101 across the inner member 1025. The inner member 1025 and the outer member 1026 are coupled to form the ejecting portion 1022C having a hollow shape. In this manner, by dividing the ejecting portion 1022C into the inner member 1025 and the outer member 1026 and coupling and assembling these members, the degree of freedom in designing the shape of the ejecting portion 1022C can be improved and the cost associated with the mold fabrication can be reduced.

Further, the ejecting portion 1022C further includes the connecting portion 1027 that connects the inner member 1025 and the outer member 1026. By bending the connecting portion 1027, the inner member 1025 and the outer member 1026 are coupled. Therefore, it is easy to couple the inner member 1025 and the outer member 1026.

Although the embodiments of the present invention have been illustratively described above, the present invention is not limited to these embodiments, and other configurations can be adopted as necessary.

In the above embodiment, the in-vehicle camera 1100 is attached to the garnish 1300 via the camera attaching member 1110. However, the in-vehicle camera 1100 may be attached to the body panel 1210 of the vehicle. Also in this case, after attaching the nozzle unit 1002 to the inner surface of the garnish 1300, the in-vehicle camera 1100 can be inserted from the opening portion 1302 of the garnish 1300 and attached to the body panel 1210 by a dedicated bracket. Therefore, it is not necessary to detach the garnish 1300 or enlarge the size of the opening portion 1302. Meanwhile, in the case of a vehicle structure in which a garnish is not provided on the outside of a body panel, the nozzle unit and the in-vehicle camera may be directly attached to the body panel (an example of the vehicle body panel), and the ejection portion of the nozzle may protrude to the outside of the vehicle from a gap between the opening portion of the body panel and the in-vehicle camera. In this case, in order to secure the water tightness of the body panel, it is preferable to provide a seal member or the like in the opening portion of the body panel.

Further, in the above embodiment, in accordance with the shape of the garnish 1300 formed in a substantially L shape, the nozzle unit 1002 is provided with the attachment part 1021 that has the first attachment part 1021A protruding laterally from the nozzle 1022, and the second attachment part 1021B protruding downward from the first attachment part 1021A. However, the present invention is not limited to this example. Since the nozzle unit 1002 is a member independent of the camera attaching member 1110 of the in-vehicle camera 1100, the shape of the attachment part 1021 of the nozzle unit 1002 can be appropriately changed in accordance with the shape of the body panel and the garnish.

Further, in the above embodiment, the hose 1004 is directly connected to the nozzle 1022 of the nozzle unit 1002, and high-pressure air is introduced from the high-pressure air generation unit 1005. However, for example, a substantially L-shaped joint member may be connected between the nozzle 1022 and the hose 1004. By connecting the nozzle 1022 and the hose 1004 via the joint member, the posture of the hose 1004 with respect to the nozzle 1022 can be changed, so that the degree of freedom in attaching the nozzle unit 1002 to the garnish 1300 is increased.

Meanwhile, the present invention is not limited to the above-described embodiments, but can be appropriately deformed or improved. In addition, the materials, shapes, dimensions, numerical values, modes, quantities, and locations and the like of the respective components in the above-described embodiments are arbitrary and not limited as long as they can achieve the present invention.

For example, in the above examples, the application to the in-vehicle camera has been described. However, the object to which the present invention is applied is not limited as long as it is a camera used outdoors. For example, a camera mounted so as to be exposed toward the outside of an airplane, a railroad, a ship, a robot, an outdoor installation object, a building and the like may be included.

Further, in the above-described examples, the application to the camera (not limited to visible light) has been described. However, the sensor to which the present invention is applied is not limited to this. The present invention may be applied to sensors attachable to vehicles, such as LIDAE (laser radar), millimeter wave radars, and ultrasonic sensors.

Further, the target portion from which the foreign matter removal device removes foreign matters is not limited to the lens of the camera. For example, the present invention can be applied to a foreign matter removal device for removing foreign matters adhering on "partition wall" which is defined as a concept including an optical lens of a sensor element, a cover for covering a front surface of an optical lens, a cover for covering a vehicle mounted component such as a lamp having a part serving as a communication window of a sensor, a mirror, a bumper, a grill and a door knob, and a vehicle window when a sensor is mounted in a vehicle compartment. Meanwhile, this partition wall is not limited to a transparent member (translucency), but may not be transparent in an ultrasonic sensor, a millimeter wave radar or the like.

Although the present invention has been described in detail with reference to specific embodiments thereof, it will be apparent to one skilled in the art that various changes and modifications can be made therein without departing from the spirit and scope thereof.

The present application is based on Japanese Patent Application (Patent Application No. 2015-131783) filed on Jun. 30, 2015, Japanese Patent Application (Patent Application No. 2015-131784) filed on Jun. 30, 2015, and Japanese Patent Application (Patent Application No. 2015-131787) filed on Jun. 30, 2015, the contents of which are incorporated herein by reference.

REFERENCE NUMERALS LIST

1: Foreign Matter Removal Device, 2: Nozzle Unit, 3: Joint Member, 4: Hose, 5: High-Pressure Air Generation Unit, 21: Attachment Part, 22: Nozzle, 51: Housing, 52: Piston, 55: Motor (Drive Source), 58: Urging Spring (Elastic Member), 65: Moving Mechanism (Generation Unit), 22A: Communication Portion, 22B: Extension Portion, 22C: Ejection Portion, 23: Inlet Port, 24: Ejection Port, 25: Adhesive Member, 71: Communication Passage, 91: Camera Bracket, 92: Pipeline, 93: Pipeline Inlet, 94: Pipeline Outlet, 95: Opening Portion, 96A, 96B: Gap, 97, 98: Opening, 100: In-Vehicle Camera, 101: Lens, 102: Housing, 103: Connector Part, 200B: Rear Bumper, 200*b*: Rear Bumper Panel, 200*c*: Outer Panel, V: Vehicle

What is claimed is:

1. A foreign matter removal device that removes foreign matters adhering to a lens included in a vehicle camera, the foreign matter removal device comprising:
a camera bracket that attaches the vehicle camera to a body panel of a vehicle in a state in which the lens is exposed toward the outside of the body panel of the vehicle,
a high-pressure air generation unit disposed inside the body panel and configured to generate high-pressure air; and a nozzle unit provided with a nozzle that injects the high-pressure air toward the lens, the nozzle unit and the vehicle camera are separately attached to the camera bracket, wherein a through-hole is formed in the camera bracket, and the high-pressure air generated by the high-pressure air generation unit passes from the inside to the outside of the body panel through the through-hole, and is injected from the nozzle toward the lens.

2. The foreign matter removal device according to claim 1, wherein
the through-hole is a pipeline through which the high-pressure air passes.

3. The foreign matter removal device according to claim 2, wherein
the high-pressure air generation unit has a discharge port that discharges the high-pressure air,
the pipeline has a pipeline inlet into which the high-pressure air flows and a pipeline outlet from which the high-pressure air flows out, and
the foreign matter removal device further comprises
a hose that connects the discharge port and the pipeline inlet; and
a joint member that connects the hose and the pipeline inlet.

4. The foreign matter removal device according to claim 3, wherein
the nozzle has an inlet port into which the high-pressure air flows,
the inlet port is larger than the pipeline outlet, and
a gap is formed between an outer peripheral surface of the pipeline and an inner peripheral surface of the inlet port in a state in which the nozzle communicates with the pipeline.

5. The foreign matter removal device according to claim 3, wherein
the joint member is formed integrally with the camera bracket.

6. The foreign matter removal device according to claim 1, wherein
the nozzle unit is formed integrally with the camera bracket.

7. The foreign matter removal device according to claim 1, wherein
the nozzle unit is attached to a housing of the vehicle camera via an adhesive member.

8. The foreign matter removal device according to claim 1, wherein
the high-pressure air generation unit has a discharge port from which the high-pressure air flows out,
the nozzle has an inlet port into which the high-pressure air flows,
the foreign matter removal device further comprises a hose that connects the discharge port and the inlet port, and
the hose passes through the through-hole.

9. A foreign matter removal device that removes foreign matters adhering to a lens of a camera, the foreign matter removal device comprising:
a camera bracket that attaches the camera to a panel member in a state in which the lens is exposed toward the outside of the panel member,
a high-pressure air generation unit disposed inside the panel member and configured to generate high-pressure air; and
a nozzle unit provided with a nozzle that injects the high-pressure air toward the lens, the nozzle unit and the vehicle camera are separately attached to the camera bracket,
wherein a through-hole is formed in the camera bracket, and
the high-pressure air generated by the high-pressure air generation unit passes from the inside to the outside of the panel member through the through-hole, and is injected from the nozzle toward the lens.

10. A foreign matter removal device that removes foreign matters adhering to a partition wall interposed between a vehicle sensor and a measuring target of the vehicle sensor, the foreign matter removal device comprising:
a bracket that attaches the vehicle sensor to a panel member in a state in which the partition wall is exposed toward the outside of the panel member,
a high-pressure air generation unit disposed inside the panel member and configured to generate high-pressure air; and
a nozzle unit provided with a nozzle that injects the high-pressure air toward the partition wall, the nozzle unit the vehicle sensor are separately attached to the bracket,
wherein a through-hole is formed in the bracket, and
the high-pressure air generated by the high-pressure air generation unit passes from the inside to the outside of the panel member through the through-hole, and is injected from the nozzle toward the partition wall.

11. A vehicle comprising the foreign matter removal device according to claim 1.

12. A foreign matter removal device that removes foreign matters adhering on a lens of a vehicle camera attached to a vehicle so that the lens of the vehicle camera is exposed toward the outside of a body panel of a vehicle, the foreign matter removal device comprising:
a high-pressure air generation unit disposed inside the body panel and configured to generate high-pressure air,
a nozzle unit including a nozzle that injects the high-pressure air toward the lens and attached to a housing of the vehicle camera; and
a pipeline that passes the high-pressure air generated by the high-pressure air generation unit from the inside to the outside of the body panel,
wherein the pipeline has a pipeline inlet into which the high-pressure air flows and a pipeline outlet from which the high-pressure air flows out,
the nozzle has an inlet port into which the high-pressure air flows,
the inlet port is larger than the pipeline outlet, and
the pipeline outlet is inserted into the inlet port.

13. The foreign matter removal device according to claim 12, wherein
in a state in which the nozzle unit is attached to the housing, an attachment direction when the vehicle camera is attached to the body panel, and a communication direction when the nozzle and the pipeline are communicated with each other intersect with each other.

14. The foreign matter removal device according to claim 12, wherein
in a state in which the vehicle camera is attached to the body panel, the nozzle communicates with the pipeline in a state in which a gap is formed between an outer peripheral surface of the pipeline and an inner peripheral surface of the nozzle.

15. The foreign matter removal device according to claim 14, wherein
a rib that prevents water from intruding into the gap from the outside is provided on the pipeline.

16. The foreign matter removal device according to claim 12, comprising:
a camera bracket that attaches the vehicle camera to the body panel,
wherein the pipeline is formed in the camera bracket.

17. A foreign matter removal device that removes foreign matters adhering on a lens of a camera attached to a vehicle so that the lens of the camera is exposed toward the outside of a panel member, the foreign matter removal device comprising:
a high-pressure air generation unit disposed inside the panel member and configured to generate high-pressure air,
a nozzle unit including a nozzle that injects the high-pressure air toward the lens and attached to a housing of the camera; and
a pipeline that passes the high-pressure air generated by the high-pressure air generation unit from the inside to the outside of the panel member,
wherein the pipeline has a pipeline inlet into which the high-pressure air flows and a pipeline outlet from which the high-pressure air flows out,
the nozzle has an inlet port into which the high-pressure air flows,
the inlet port is larger than the pipeline outlet, and
the pipeline outlet is inserted into the inlet port.

18. A foreign matter removal device that removes foreign matters adhering to a partition wall interposed between an vehicle sensor and a measuring target of the vehicle sensor, the foreign matter removal device comprising:
a high-pressure air generation unit disposed inside a panel member and configured to generate high-pressure air,
a nozzle unit including a nozzle that injects the high-pressure air toward the partition wall and attached to a housing of the vehicle sensor; and
a pipeline that passes the high-pressure air generated by the high-pressure air generation unit from the inside to the outside of the panel member,
wherein the pipeline has a pipeline inlet into which the high-pressure air flows and a pipeline outlet from which the high-pressure air flows out,
the nozzle has an inlet port into which the high-pressure air flows,
the inlet port is larger than the pipeline outlet, and
the pipeline outlet is inserted into the inlet port.

19. A vehicle comprising the foreign matter removal according to claim 12.

20. A foreign matter removal device that removes foreign matters adhering on a lens of a vehicle camera attached to a vehicle so that the lens of the vehicle camera is exposed toward the outside of a vehicle body panel, the foreign matter removal device comprising:
a generation unit that generates high-pressure air; and
a nozzle that injects the high-pressure air toward the lens,
wherein the nozzle is attached to an inner surface of the vehicle body panel, and a tip end portion thereof protrudes to the outside of the vehicle through a gap formed between the vehicle body panel and the vehicle camera and is disposed to face the front surface of the lens; and
wherein the tip end portion of the nozzle has an opening shape which is bent to the opposite side of the side facing the lens and then is bent again toward the side of the lens.

21. The foreign matter removal device according to claim 20, wherein
an angle formed by a line passing through the center of an ejecting port of the nozzle and a tangential line of the apex of the lens is 0° or more but 60° or less.

22. The foreign matter removal device according to claim 20, wherein
when the lens is divided into six equal parts in an upper and lower direction, the line passing through the center of the ejecting port of the nozzle intersects with the second region from the top of the lens.

23. The foreign matter removal device according to claim 20, wherein
the tip end portion of the nozzle includes an inner member facing the lens and an outer member disposed on the side opposite to the lens across the inner member, and
the inner member and the outer member are coupled to form the tip end portion having a hollow shape.

24. The foreign matter removal device according to claim 23, wherein
the tip end portion further includes a connecting portion that connects the inner member and the outer member, and
the inner member and the outer member are coupled by bending the connecting portion.

25. A foreign matter removal device that removes foreign matters on a lens of a camera attached to a panel member so that the lens of the camera is exposed toward the outside of the panel member, the foreign matter removal device comprising:
a generation unit that generates high-pressure air; and
a nozzle that injects the high-pressure air toward the lens,
wherein the nozzle is attached to an inner surface of the panel member, and a tip end portion thereof protrudes to the outside of the panel member through a gap formed between the panel member and the camera and is disposed to face the front surface of the lens; and
wherein the tip end portion of the nozzle has an opening shape which is bent to the opposite side of the side facing the lens and then is bent again toward the side of the lens.

26. A foreign matter removal device that removes foreign matters adhering to a partition wall interposed between an vehicle sensor and a measuring target of the vehicle sensor, the foreign matter removal device comprising:
a generation unit that generates high-pressure air; and
a nozzle that injects the high-pressure air toward the partition wall,
wherein the nozzle is attached to an inner surface of a panel member, and a tip end portion thereof protrudes to the outside of the panel member through a gap formed between the panel member and the vehicle sensor and is disposed to face the front surface of the partition wall; and
wherein the tip end portion of the nozzle has an opening shape which is bent to the opposite side of the side facing the lens and then is bent again toward the side of the lens.

27. A vehicle comprising the foreign matter removal device according to claim 20.

* * * * *